(12) United States Patent
Suzuki

(10) Patent No.: US 7,453,239 B2
(45) Date of Patent: Nov. 18, 2008

(54) CHARGING APPARATUS HAVING A SWITCHING ELEMENT FOR CONTROLLING CHARGING POWER

(75) Inventor: Hitoshi Suzuki, Anjo (JP)

(73) Assignee: Makita Corporation, Anjo-Shi, Aichi (JP)

( * ) Notice: Subject to any disclaimer, the term of this patent is extended or adjusted under 35 U.S.C. 154(b) by 348 days.

(21) Appl. No.: 10/971,964

(22) Filed: Oct. 22, 2004

(65) Prior Publication Data

US 2005/0093517 A1    May 5, 2005

(30) Foreign Application Priority Data

Oct. 29, 2003    (JP)    ............... 2003-369597

(51) Int. Cl.
| | |
|---|---|
| H02J 7/24 | (2006.01) |
| H02J 7/04 | (2006.01) |
| H02M 3/335 | (2006.01) |
| G05F 1/46 | (2006.01) |
| G05F 1/14 | (2006.01) |
| G05F 1/24 | (2006.01) |
| G05F 1/00 | (2006.01) |

(52) U.S. Cl. .................. 320/152; 320/141; 320/150; 320/153; 363/16; 323/247; 323/255; 323/259; 323/266; 323/273; 323/274; 323/275

(58) Field of Classification Search .......... 320/150, 320/141, 153, 152; 323/247, 257, 265–266, 323/273–277, 259, 255; 363/16, 20, 21.01, 363/4, 21.05, 7, 21.1

See application file for complete search history.

(56) References Cited

U.S. PATENT DOCUMENTS 4,873,453 A    10/1989    Schmerda et al.

5,619,116 A    4/1997    Takano et al.

(Continued)

FOREIGN PATENT DOCUMENTS

JP    62-123926    6/1987

(Continued)

OTHER PUBLICATIONS

European Search Report, Issued Sep. 9, 2005.

(Continued)

*Primary Examiner*—Akm Enayet Ullah
*Assistant Examiner*—Richard V Muralidar
(74) *Attorney, Agent, or Firm*—Orrick, Herrington & Sutcliffe LLP

(57) ABSTRACT

A charging device that may perform charging with larger current is provided. The charging device comprises a switching element for increasing or decreasing charging power, a PWM controlling circuit for intermittently turning the switching element on or off, a current detecting circuit for detecting current flowing through the switching element, and a rectifying circuit for rectifying output voltage of the current detecting circuit in response to power supply voltage. The PWM controlling circuit has a limiter terminal for turning off the switching element when voltage equal to or above a determined value is input, and rectified voltage from the rectifying circuit is input to the limiter terminal. In this charging device, an amount of temperature increase of the switching element is suppressed so as to remain within a fixed range, and the charging power is not restricted unnecessarily.

5 Claims, 14 Drawing Sheets

U.S. PATENT DOCUMENTS

| | | | |
|---|---|---|---|
| 5,986,437 A * | 11/1999 | Lee | 320/162 |
| 6,094,362 A | 7/2000 | Domingo | |
| 6,329,727 B1 | 12/2001 | Traveis et al. | |
| 6,611,439 B1 | 8/2003 | Yang et al. | |
| 6,703,793 B2 * | 3/2004 | Kitano | 315/224 |
| 2003/0002233 A1 | 1/2003 | Usui | |
| 2003/0031035 A1 | 2/2003 | Kitano | |

FOREIGN PATENT DOCUMENTS

| | | |
|---|---|---|
| JP | 63-63046 | 4/1988 |
| JP | 6-22467 | 1/1994 |
| JP | 09084332 | 3/1997 |
| JP | 11-074001 | 3/1999 |
| JP | 11-252932 | 9/1999 |
| JP | 2000-341801 | 8/2000 |
| JP | 2001-245438 | 9/2001 |

OTHER PUBLICATIONS

European Search Report, Issued Apr. 27, 2005.
European Search Report, Issued Feb. 2, 2005.
English Translation of the Japanese Office Action for Application No. 2003-369597.
Communication pursuant to Article 96(2) EPC; Sep. 21, 2005.

* cited by examiner

CHARGING APPARATUS HAVING A SWITCHING ELEMENT FOR CONTROLLING CHARGING POWER

CROSS-REFERENCE TO RELATED APPLICATION

This application claims priority to Japanese Patent Application No. 2003-369597, filed on Oct. 29, 2003, the entire contents of which are hereby incorporated by reference.

BACKGROUND OF THE INVENTION

1. Field of the Invention

The present invention relates to a charging device for charging a rechargeable battery. In particular, it relates to a charging device wherein a switching element is pulse-width modulated, thereby increasing or decreasing charging power.

2. Description of the Related Art

In a charging device, it is desirable for the charging power to be as large as the charging device can handle. The rechargeable battery is thus charged rapidly.

In charging devices, rated power is usually fixed, and adjustments of the charging power take place within the range of that rated power. Japanese Patent No. 3384079 sets forth a technique for distinguishing the number of battery cells contained in a battery pack to be charged, and determining a charging current based on the number of battery cells. When a battery pack with a large number of cells is to be charged, charging voltage is high, and consequently the charging current is reduced. When a battery pack with a small number of cells is to be charged, charging voltage is low, and consequently a large charging current is caused to flow. In this manner, the charging power is adjusted within the range of rated power of the charging device, and the charging current that is as large as possible within the range of rated power flows for charging the battery pack.

SUMMARY OF THE INVENTION

In the prior technique, the charging current is adjusted within the range of the rated power of the charging device. This is the most usual method, and no-one has questioned it.

The present inventor researched the boundaries within which the charging device can be used safely and discovered that there is not necessarily a correspondence between the rated power and the boundaries of safe usage of the charging device. From this research, the present inventor discovered that it is the temperature increase of a switching element (which increases or decreases the charging power) that determines the boundaries of safe usage of the charging device. As long as the temperature increase of the switching element is within a boundary, the charging device may be used safely. Further, the inventor discovered that the amount of temperature increase of the switching element does not necessarily depend on the magnitude of the charging power.

The temperature increase of the switching element is determined by heating caused by the resistance of the switching element while it is in an 'on' state, and by heating caused by switching loss of the switching element.

The heating caused by the resistance of the switching element is affected by the size of a current flowing through the switching element while it is 'on'. By contrast, the heating caused by switching loss of the switching element is affected by the size of voltage applied to the switching element. For these reasons, even if the power flowing through the switching element is unchanged, an identical amount of heating does not occur (a) when a high voltage is applied to the switching element and a low current flows through the switching element; and (b) when the voltage is low and the current is high.

FIG. 2 shows the power CP flowing through the switching element on a horizontal axis, and the amount of temperature increase of the switching element on a vertical axis. The amount of temperature increase shows the difference between terminal temperature of the switching element and environmental temperature when the switching element has grown heated due to the flow of the power. 'H' in the figure shows a case where a high voltage is applied to the switching circuit. 'M' shows a case where the voltage is medium. 'L' shows a case where the voltage is low. In the case shown in FIG. 2, it is clear that, for a given value of the power CP1, the amount of temperature increase $\Delta T$ of the switching element is low when the voltage is high, and the amount of temperature increase $\Delta T$ of the switching element is high when the voltage is low. If the amount of temperature increase of the switching element has a boundary $\Delta T1$, it is clear that the power greater than CP1 (up to CP3 in the case in FIG. 2) can be caused to flow when the voltage is high, whereas the power above CP1 cannot be caused to flow when the voltage is low.

FIG. 2 shows that the charging power can be increased to the level CP3 as shown by the broken line instead of being restricted within the rated power CP1 without overheating the switching element when the voltage is 'H'. When the voltage is 'M', the charging power can be increased to the level CP2 which is higher than the rated power CP1. If the charging power that flows the switching element is increased, the charging current to the battery is increased and it thus becomes possible to complete charging operation of the battery in a shorter period.

The present invention overcomes the prior art problem wherein the charging power is restricted within the rated power even in cases where a larger power would be allowed without overheating the switching element.

A charging device of the present teachings comprises a switching element for increasing or decreasing charging power, a PWM (pulse-width-modulation) controlling circuit for intermittently turning the switching element 'on' and 'off', a current detecting circuit for detecting current flowing through the switching element, and a correcting circuit for correcting output voltage of the current detecting circuit depending on power supply voltage that is applied to the switching element. The PWM controlling circuit has a limiter terminal for turning 'off' the switching element when voltage equal to or above a predetermined value is input, and corrected voltage from the correcting circuit is input to the limiter terminal.

FIG. 3 shows the current CS flowing through the switching element on the horizontal axis and shows a temperature increase $\Delta T$ of the switching element on the vertical axis. 'H' in the figure shows a case where the voltage is high. 'M' shows a case where the voltage is medium. 'L' shows a case where the voltage is low. In the case shown in FIG. 3, it can be seen that, for a given value of the current CS3, the amount of temperature increase $\Delta T$ of the switching element is high when the power supply voltage is high, whereas $\Delta T$ is low when the power supply voltage is low. If the current is the same, the higher the voltage the greater the power, and there is no contradiction with the results of FIG. 2. In FIG. 3, the power CP3 by the high voltage 'H' and the low current CS3 is greater than the power CP2 by the mediate voltage 'M' and the mediate current CS2. Similarly, the power CP2 by the mediate voltage 'M' and the mediate current CS2 is greater than the power CP1 by the low voltage 'L' and the high current CS3.

Let a temperature increase boundary of the switching element be ΔT1 in FIG.3. It means that as long as the temperature increase of the switching element is within ΔT1, the charging device can be used safely. FIG. 3 shows that the current CS1 can flow through the switching element in the case of the low voltage shown by 'L'. The current CS2 can flow through the switching element in the case of the medium voltage shown by 'M', and the current CS3 can flow through the switching element in the case of the high voltage shown by 'H'. That is, the greatest charging current that can flow through the switching element depends on the voltage that is being applied to the switching element. The amount of temperature increase of the switching element can be suppressed so as to remain within the temperature increase boundary ΔT1 by changing an upper limit value of the charging current in response to voltage. FIG. 2 shows that the maximum charging power that remains the temperature increase of the switching element within the temperature increase boundary ΔT1 varies depending on the voltage applied to the switching element. FIG. 3 shows that the maximum charging current that remains the temperature increase of the switching element within the temperature increase boundary ΔT1 varies depending on the voltage applied to the switching element.

It is clear from the results shown in FIG. 3 that the amount of temperature increase of the switching element can be suppressed so as to remain equal to or below the temperature increase boundary ΔT1, if a current greater than CS3 is prevented from flowing through the switching element in the case of the high voltage 'H', a current greater than CS2 is prevented from flowing through the switching element in the case of the medium voltage 'M', and a current greater than CS1 is prevented from flowing through the switching element in the case of the low voltage 'L'.

The charging device of the present teachings uses the limiter terminal provided in the PWM controlling circuit to obtain the above results. The limiter terminal turns the switching element 'off' when a voltage equal to or above a predetermined value (to simplify, this will be termed a limiter voltage) is input to the limiter terminal.

Providing the correcting circuit that corrects the output voltage of the current detecting circuit in response to the power supply voltage makes it possible that the permitted current CS3 for the 'H' voltage, the permitted current CS2 for the 'M' voltage, and the permitted current CS1 for the 'L' voltage, each be corrected to the limiter voltage. Inputting these corrected voltages to the limiter terminal of the PWM controlling circuit makes it possible:

(a) to prevent a current greater than CS3 from flowing through the switching element in the case of the high voltage 'H';

(b) to prevent a current greater than CS2 from flowing through the switching element in the case of the medium voltage 'M'; and (c) to prevent a current greater than CS1 from flowing through the switching element in the case of the low voltage 'L'.

In this charging device, the correcting circuit and the limiter function of the PWM controlling circuit are used to restrict the current flowing through the switching element. The amount of temperature increase of the switching element is thus suppressed so that this will remain within the temperature increase boundary. The charging power is not fixed, but varies according to the voltage, so that the higher the voltage the higher the power (see FIG. 2). Unlike the prior art charging devices in which charging power is restricted by the rated power, charging power is not restricted unnecessarily.

FIG. 2 is merely an example. Depending on the characteristics of the switching element, the maximum power for suppressing the amount of temperature increase of the switching element so that this will remain within the temperature increase boundary may decrease with increasing voltage. In this case, power will be restricted at a small value when the voltage applied to the switching element is high. In either of these cases, the charging power is not restricted by the rated power. The charging device of the present teachings restricts the charging power so as to suppress the amount of temperature increase of the switching element such that it remains within the temperature increase boundary. This charging device causes the flow of current as large as possible—within the temperature increase boundaries of the switching element—and charging operation can thus be completed within a short period.

It is preferred that, irrespective of differences in the power supply voltage, the correcting circuit corrects the output voltage of the current detecting circuit to the predetermined voltage that operates the limiter terminal of the PWM controlling circuit when the detected current generates the temperature increase boundary ΔT1.

If the correcting circuit corrects the permitted current CS1 to the limiter voltage in the case of the high voltage 'H', corrects the permitted current CS2 to the limiter voltage in the case of the medium voltage 'M', and corrects the permitted current CS3 to the limiter voltage in the case of the low voltage 'L', the limiter function can suppress the amount of temperature increase of the switching element so as to remain within the temperature increase boundary ΔT1. It is thus possible to continue using the charging device safely.

The correcting circuit used in the present teachings may apply bias voltage to the output voltage of the current detecting circuit, this bias voltage growing higher as the power supply voltage grows higher. Alternatively, the output voltage of the current detecting circuit may be divided by using a dividing ratio that grows higher in accordance with the power supply voltage growing higher. In this latter case, if the output voltage of the current detecting circuit is V1, and the dividing voltage ratio is k, then the voltage V2 after being corrected becomes V2=k·V1, wherein the dividing ratio k is high when the power supply voltage is high.

The maximum current that raises the temperature of the switching element no further than a given amount of temperature increase changes depending on the power supply voltage. As shown in FIG.3, this maximum current is high when the power supply voltage is low. If the maximum current is corrected as stated above in response to the power supply voltage, the corrected voltages become nearly same voltage despite of variations of the power supply voltages. In the case as shown in FIG.3, the current CS3 detected when the power supply voltage is high is corrected to a certain voltage, the current CS2 detected when the power supply voltage is middle is corrected to the certain voltage, and the current CS1 detected when the power supply voltage is low is corrected to the certain voltage. When the corrected voltages from the current CS3 (at high voltage), CS2 (at middle voltage) and CS1 (at low voltage) are equal to the limiter voltage of the PWM controlling circuit, the maximum charging currents are limited to CS3 when the power supply voltage is high, limited to CS2 when the power supply voltage is middle, and limited to CS1 when the power supply voltage is low. In each case, the temperature increase of the switching element remains within the given amount. As described above, the charging powers are not constant. In the case of FIG. 2, the charging power (CP3=CS3×'H' voltage) at the high power supply voltage is large, and the charging power (CP1=CS1×'L' voltage) at the low power supply voltage is small.

In this charging device of the teachings, it is thus possible to suppress the amount of temperature increase of the switching element so that this remains within the permitted amount of temperature increase.

As described above, suppressing the amount of temperature increase of the switching element so that this remains within a fixed range allows the usage of the charging device at its maximum capacity. The technique described thus far uses a principle that, in response to the power supply voltage, the magnitude of the maximum charging power of the charging device varies. However, it is also possible to exert more direct control by using the temperature of the switching element.

A charging device using this principle comprises a switching element for increasing or decreasing charging power, a PWM controlling circuit for intermittently turning the switching element 'on' and 'off', a current detecting circuit for detecting current flowing through the switching element, and a correcting circuit for correcting output voltage of the current detecting circuit depending on the temperature of the switching element. The PWM controlling circuit has a limiter terminal for turning 'off' the switching element when voltage equal to or above a predetermined value is input, and corrected voltage from the correcting circuit is input to the limiter terminal.

In this charging device, the output voltage from the current detecting circuit is corrected in response to the temperature of the switching element, and is input to the limiter terminal. When the switching element has heated up and approached a boundary temperature, a voltage corresponding to the current of the switching element is corrected to approach to the limiter voltage. When the limiter voltage is input to the limiter terminal, the PWM controlling circuit restricts the current flowing through the switching element, and further heating of the switching element is thereby suppressed. When the temperature of the switching element is low, a voltage corresponding to the current of the switching element is corrected to a value smaller than the limiter voltage. The current flowing through the switching element is not restricted, the switching element causes a great amount of power to flow, and the charging current increases. Unlike the charging devices which are restricted by the rated power, charging power is not restricted unnecessarily in this charging device. Simultaneously, overheating of the switching element is prevented.

The correcting circuit used in this charging device may divide the output voltage of the current detecting circuit by using a dividing rate that increases as the temperature of the switching element rises. If the output voltage of the current detecting circuit is V1, and the dividing rate is k, the voltage V2 after being corrected becomes V2=k·V1 wherein the dividing rate k is high when the temperature of the switching element is high.

According to the correcting circuit, the corrected voltage increases and approaches to the limiter voltage when the switching element temperature approaches to the maximum allowable level. In this charging device, it is thus possible to suppress overheating of the switching element.

It is preferred that a setting means for setting charging current target value is added to this charging device. In this case, it is preferred that the PWM controlling circuit adjusts any increases or decreases in a duty ratio so that the charging current will be adjusted to the set target value, and that the setting means reduces the charging current target value when the detected charging current has become smaller than the set target value by an extent of reduction exceeding a predetermined value.

In this charging device, the duty ratio of the switching element is increased or decreased so that the charging current will be equal to the set target value. At this juncture, if a limiter function of the PWM controlling circuit operates and the current flowing through the switching element is restricted, the charging current is thus reduced than the set target value. In this case, it can be determined that the set target value for the charging current are too high, and therefore the limiter function of the PWM controlling circuit is operating. Therefore, the target value for the charging current is reduced at this juncture. By doing this, the limiter function no longer operates, and the charging current is adjusted by using the target value that has been newly set.

This charging device allows the amount of temperature increase of the switching element to be suppressed so that it remains within the temperature increase boundary, and simultaneously performs charging operation while adjusting the charging current at the target value.

The target vale of the charging current may be decided based on the condition of the battery to be charged. When the battery temperature is low, the battery allows larger current for rapid charging. When the battery temperature becomes high, the charging current should be reduced in order to avoid overheating of the battery. The target vale of the charging current may be decided based on the battery temperature and battery temperature increase speed. The current thus determined may be too large for the switching element. If the charging current determined from the battery temperature flows through the switching element, the switching element may be overheated. In the charging device of the present teachings, overheating of the switching element is prevented by using the limiter function of the PWM controlling circuit. However, when the limiter function operates, the actual charging current may be lower than the target value of the charging current determined from the battery temperature. By reducing the target value of the charging current, it becomes possible to maintain the actual charging current at the target value.

According to the present teachings, it is possible to suppress the amount of temperature increase of the switching element to remain within a fixed region, and it it possible to charge the battery as short as possible within its boundary of safe usage of the charging device.

PREFERRED FEATURES TO PRACTICE THE INVENTION

Preferred features to practice the present invention are described below.
(1) The charging device has a MOSFET for adjusting charging current.
(2) The charging device has a PWM controlling circuit that controls pulse-width-modulation (PWM) of the MOSFET. The PWM controlling circuit has a limiter terminal.
(3) The charging device detects current flowing through the MOSFET in the form of voltage, and applies bias voltage to the detected voltage. The bias voltage has a size corresponding to the size of power supply voltage.
(4) The charging device has a thermistor located in the vicinity of the MOSFET.
(5) The charging device sets charging current target value in response to the temperature state of a rechargeable battery.
(6) The charging device detects the charging current. When the detected charging current falls by a given amount below the charging current target value, the target value is reduced.

PREFERRED EMBODIMENTS OF THE INVENTION

Embodiment 1

Figure 1:
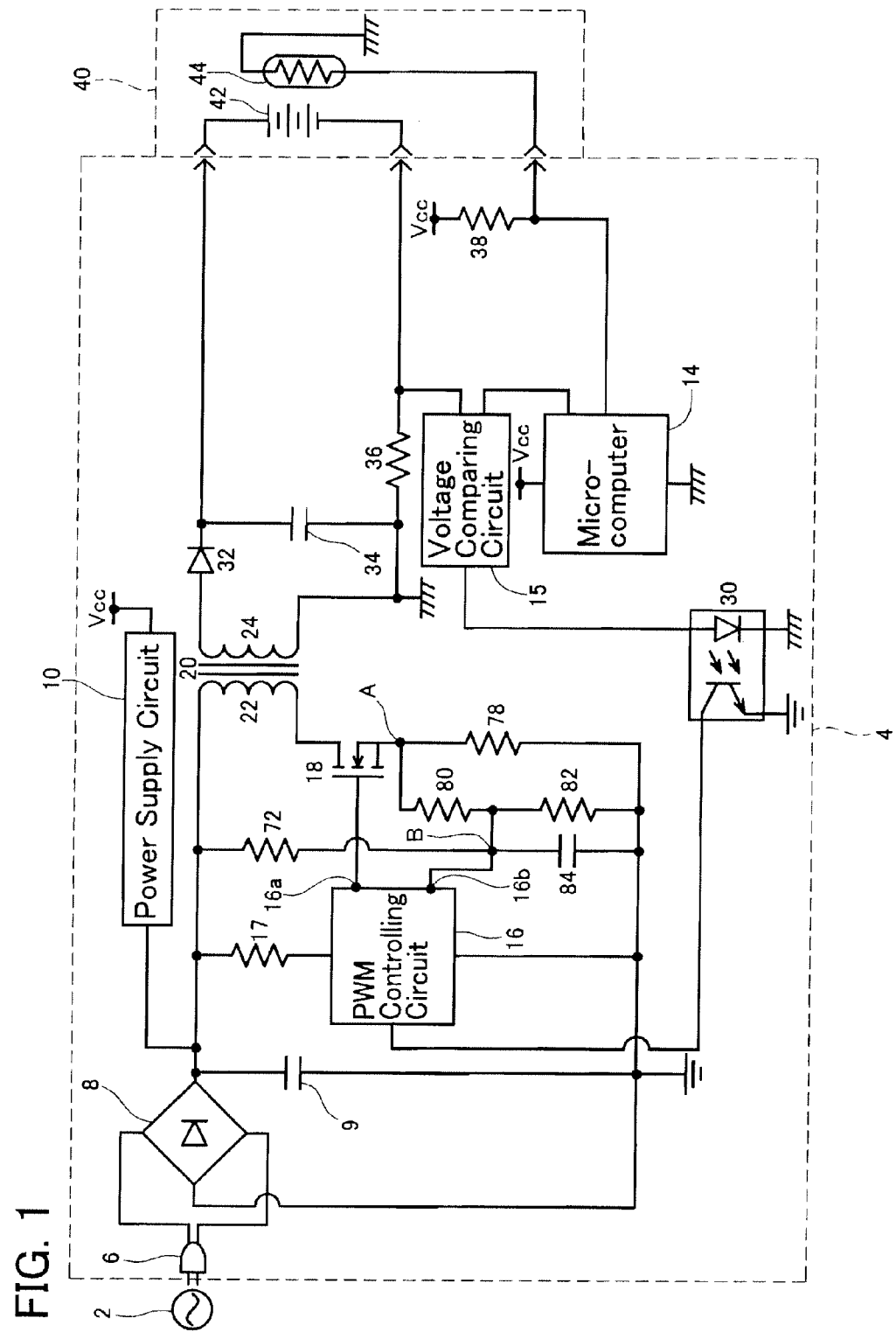
FIG. 1 shows the configuration of a charging device of Embodiment 1.

A charging device 4 of Embodiment 1 is described referring to figures. FIG. 1 shows the circuit configuration of the charging device 4 of Embodiment 1. In FIG. 1, a battery pack 40 is connected with the charging device 4. The charging device 4 charges a rechargeable battery 42 housed within the battery pack 40. The battery pack 40 has a thermistor 44 for detecting the temperature of the rechargeable battery 42.

As shown in FIG. 1, the charging device 4 has a power supply plug 6, a rectifier circuit 8, a condenser 9, a transformer 20, etc.

The power supply plug 6 is connected with an alternating current supply 2. AC power that is input from the power supply plug 6 is rectified and smoothed by the rectifier circuit 8 and the condenser 9, then is input to a primary winding 22 of the transformer 20.

The charging device 4 can use an alternating current supply 2 having various voltages. For example, it can use an alternating current supply having a voltage of 100V, of 110V, of 180V, of 220V, of 260V, etc.

The charging device 4 has a constant-voltage regulated power supply circuit 10, a microcomputer 14, a voltage comparing circuit 15, and a PWM controlling circuit 16. Further, a MOSFET 18 is interposed in a circuit that connects the rectifier circuit 8 and the primary winding 22 of the transformer 20. The constant-voltage regulated power supply circuit 10 supplies the microcomputer 14, etc. with power supply voltage.

The PWM controlling circuit 16 is a circuit that turns the MOSFET 18 periodically 'on' and 'off'. The PWM controlling circuit 16 adjusts the power flowing through the primary winding 22 of the transformer 20 by changing the duty ratio of the MOSFET 18. The duty ratio of the MOSFET 18 is a ratio of (on-period)/(on-period+off-period). Operating voltage to be applied to the MOSFET 18 is input to the PWM controlling circuit 16 via a resistor 17.

The power passing through the primary winding 22 of the transformer 20 generates output power at a secondary winding 24 of the transformer 20. A diode 32, a condenser 34, a resistor 36, etc. are connected with the secondary winding 24 of the transformer 20. Power that is output by the secondary winding 24 is rectified and smoothed by the diode 32 and the condenser 34. It is then supplied to the rechargeable battery 42 in the battery pack 40. At this juncture, a charging current that is being sent to the rechargeable battery 42 is detected using the voltage across the resistor 36. The voltage across the resistor 36 is input to the voltage comparing circuit 15.

The battery pack 40 has the rechargeable battery 42, and the thermistor 44, etc. The thermistor 44 is provided in the vicinity of the rechargeable battery 42. Resistance of the thermistor 44 changes depending on the temperature of the rechargeable battery 42. The charging device 4 is provided with a resistor 38 connected with the constant-voltage regulated power supply circuit 10. The charging device 4 is configured such that, when the battery pack 40 has been connected therewith, a constant voltage Vcc is input to the thermistor 44 via the resistor 38. Further, one end of the resistor 38 (the thermistor 44 end) is connected with the microcomputer 14. When the battery pack 40 is connected with the charging device 4, the constant voltage Vcc is divided by the resistor 38 and the thermistor 44, and this divided voltage is input to the microcomputer 14. The divided voltage inputted to the microcomputer 14 changes depending on the temperature of the rechargeable battery 42.

The microcomputer 14 is provided with a CPU, ROM, RAM, I/O, etc. The microcomputer 14 is provided with a program for determining target value for the charging current based on the temperature state of the rechargeable battery 42. The microcomputer 14 obtains the temperature state of the rechargeable battery 42 from the divided voltage provided from the resistor 38 and the thermistor 44, and sets the target value for the charging current on the basis of the temperature state of the rechargeable battery 42. The microcomputer 14 outputs a voltage corresponding to the target value that has been set for the charging current. The voltage outputted from the microcomputer 14 is inputted to the voltage comparing circuit 15.

The voltage comparing circuit 15 compares the voltage across the resistor 36 and the output voltage of the microcomputer 14, both of which have been input to the voltage comparing circuit 15 and, based on the results of comparison, the voltage comparing circuit 15 commands the PWM controlling circuit 16 to increase or decrease the duty ratio. For example, if the voltage across the resistor 36 is greater than the output voltage of the microcomputer 14, this shows that the charging current flowing through the rechargeable battery 42 is greater than the target value that has been set. In this case, the voltage comparing circuit 15 commands the PWM controlling circuit 16 to decrease the duty ratio. Alternatively, if the voltage across the resistor 36 is smaller than the output voltage of the microcomputer 14, this shows that the charging current flowing through the rechargeable battery 42 is smaller than the target value that has been set. In this case, the voltage comparing circuit 15 commands the PWM controlling circuit 16 to increase the duty ratio. The commands output by the voltage comparing circuit 15 are input to the PWM controlling circuit 16 via a photocoupler 30.

Figure 4:
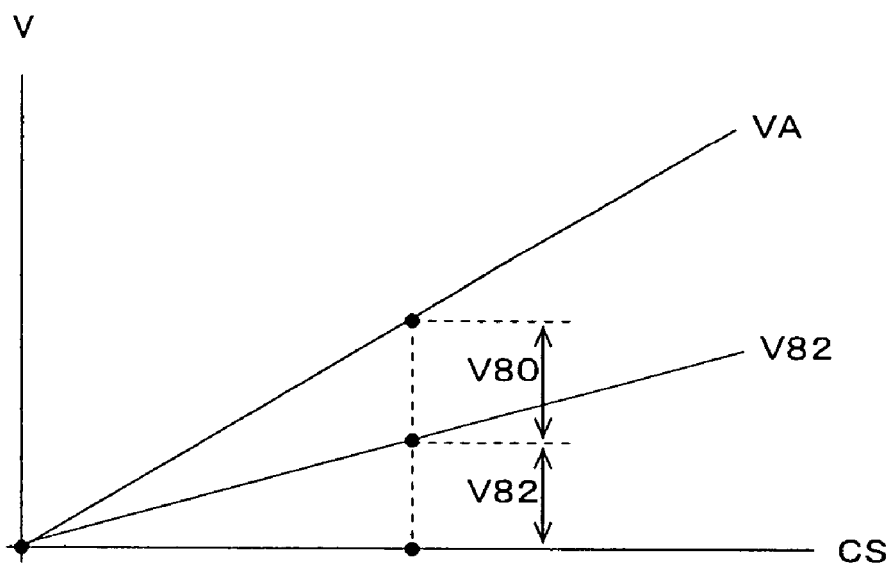
FIG. 4 is a graph showing voltage divided by a first resistor and a second resistor.

The charging device 4 is provided with a resistor 78 connected in series with the MOSFET 18. A current flowing through the resistor 78 is approximately identical with the current flowing through the MOSFET 18 and the primary winding 22 of the transformer 20. Voltage across the resistor 78 can be determined by a voltage VA at a node A of FIG. 1. FIG. 4 shows the current of the MOSFET 18 on the horizontal axis and the voltage VA at the node A on the vertical axis. VA in the figure shows the voltage VA at the node A. As is clear from FIG. 4, a current CS flowing through the MOSFET 18 can be determined from the voltage VA at the node A.

As shown in FIG. 1, the charging device 4 is provided with a series circuit comprising a first resistor 80 and a second resistor 82 that are connected parallel to the resistor 78. As shown in FIG. 4, the voltage VA at the node A is divided, by the first resistor 80 and the second resistor 82, into a voltage V80 across the first resistor 80 and a voltage V82 across the second resistor 82. Moreover, bias voltage (to be explained later) is not applied to the voltage V82 across the second resistor 82 as shown in FIG. 4. The ratio of the voltage V82 across the second resistor 82 to the voltage VA at the node A is a dividing rate. That is, if the dividing rate is k, then V82=k·VA. As is clear from FIG. 4, the current CS flowing through the MOSFET 18 can be determined by the voltage V80 across the first resistor 80 or the voltage V82 across the second resistor 82.

As shown in FIG. 1, positive output from the rectifier circuit 8 is connected between the first resistor 80 and the second resistor 82 via a power supply voltage compensating circuit (resistor) 72. By this means, bias voltage that corresponds to the power supply voltage is applied to the voltage V82 across the second resistor 82. The bias voltage grows higher as the power supply voltage grows higher.

Figure 5:
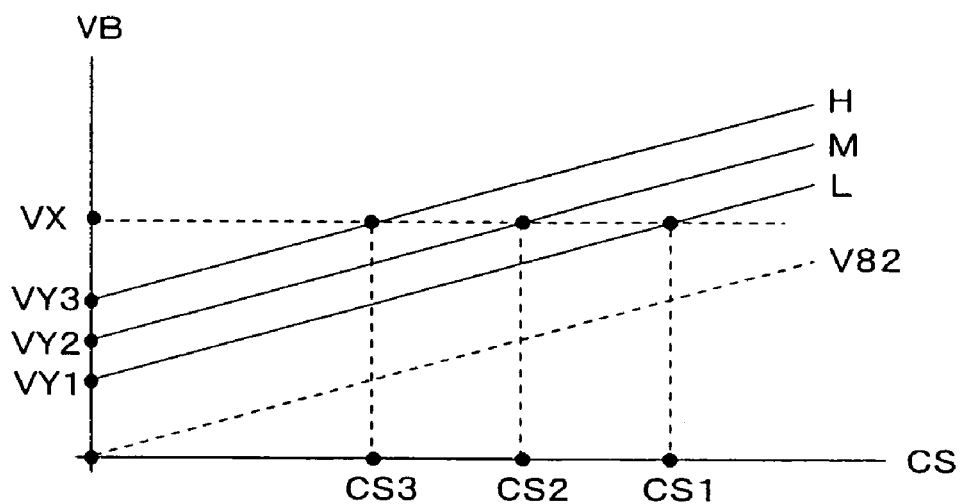
FIG. 5 is a graph showing voltage VB at a node B where bias voltage is applied.

FIG. 5 shows the current CS flowing through the MOSFET 18 on the horizontal axis and shows voltage VB at a node B (shown in FIG. 1) on the vertical axis. 'L' in the figure stands for a case where the power supply voltage is 180V, 'M' for a case where the power supply voltage is 220V, and 'H' for a case where the power supply voltage is 260V. As shown in FIG. 5, the value of the bias voltage is VY1 when the power supply voltage is 180V, is VY2 when the power supply voltage is 220V, and is VY3 when the power supply voltage is 260V. Since the bias voltage changes depending on the power supply voltage, the voltage VB at the node B changes depending on the power supply voltage even when a fixed current CS is flowing through the MOSFET 18. Put differently, the current CS flowing through the MOSFET 18 changes depending on the power supply voltage when the voltage VB at the node B remains unchanged. As shown in FIG. 5, in the case where, for example, the power supply voltage is 180V, the voltage VB at the node B has the voltage value VX when a current having the value CS1 is flowing through the MOSFET 18. By contrast, in the case where the power supply voltage is 220V, the voltage VB at the node B has the voltage value VX when a current having the current value CS2 is flowing through the MOSFET 18. In the case where the power supply voltage is 260V, the voltage VB at the node B has the voltage value VX when a current having the current value CS3 is flowing through the MOSFET 18. The relation of CS1, CS2 and CS3 with respect to the voltages of 'L','M' and 'H' are the same with the relation shown in FIG. 3.

The resistance of the resistors 72, 78, 80, 82 in the charging device 4 is selected so that the current CS flowing through the MOSFET 18 and the voltage VB at the node B will have the relationship shown in FIG. 5. Further, a condenser 84 used for noise elimination is connected with the node B.

The PWM controlling circuit 16 will now be described in detail. The PWM controlling circuit 16 has an output terminal 16a. The output terminal 16a is connected with a gate of the MOSFET 18. The PWM controlling circuit 16 outputs pulse-width-modulated signals (PWM control signals) from the output terminal 16a. The PWM control signals are periodic pulse-shaped signals. The MOSFET 18 is turned 'on' while the pulse signal is high. The MOSFET 18 is turned 'off' while the pulse signal is low. The PWM controlling circuit 16 changes the duty ratio of the MOSFET 18 by changing the pulse width of the PWM control signals.

Commands to increase or decrease the charging current that are output from the voltage comparing circuit 15 are input to the PWM controlling circuit 16 via the photocoupler 30. The PWM controlling circuit 16 changes the pulse width of the PWM control signals in response to these commands.

The PWM controlling circuit 16 is provided with a limiter terminal 16b. In the PWM controlling circuit 16, the pulse signal outputted from the PWM control circuit 16 is stopped while a voltage equal to or above a predetermined value is input to the limiter terminal 16b. That is, when the limiter function operates, the output voltage of the output terminal 16a remains low and the MOSFET 18 is prohibited from turning 'on'. The MOSFET 18 is turned 'off' at the point where the PWM control signals is stopped. In the followings, the voltage value at which the limiter function operates will be referred to as a limiter voltage VX. In the charging device 4, the node B and the limiter terminal 16b are connected, and the voltage VB at the node B is input to the limiter terminal 16b.

Figure 6:
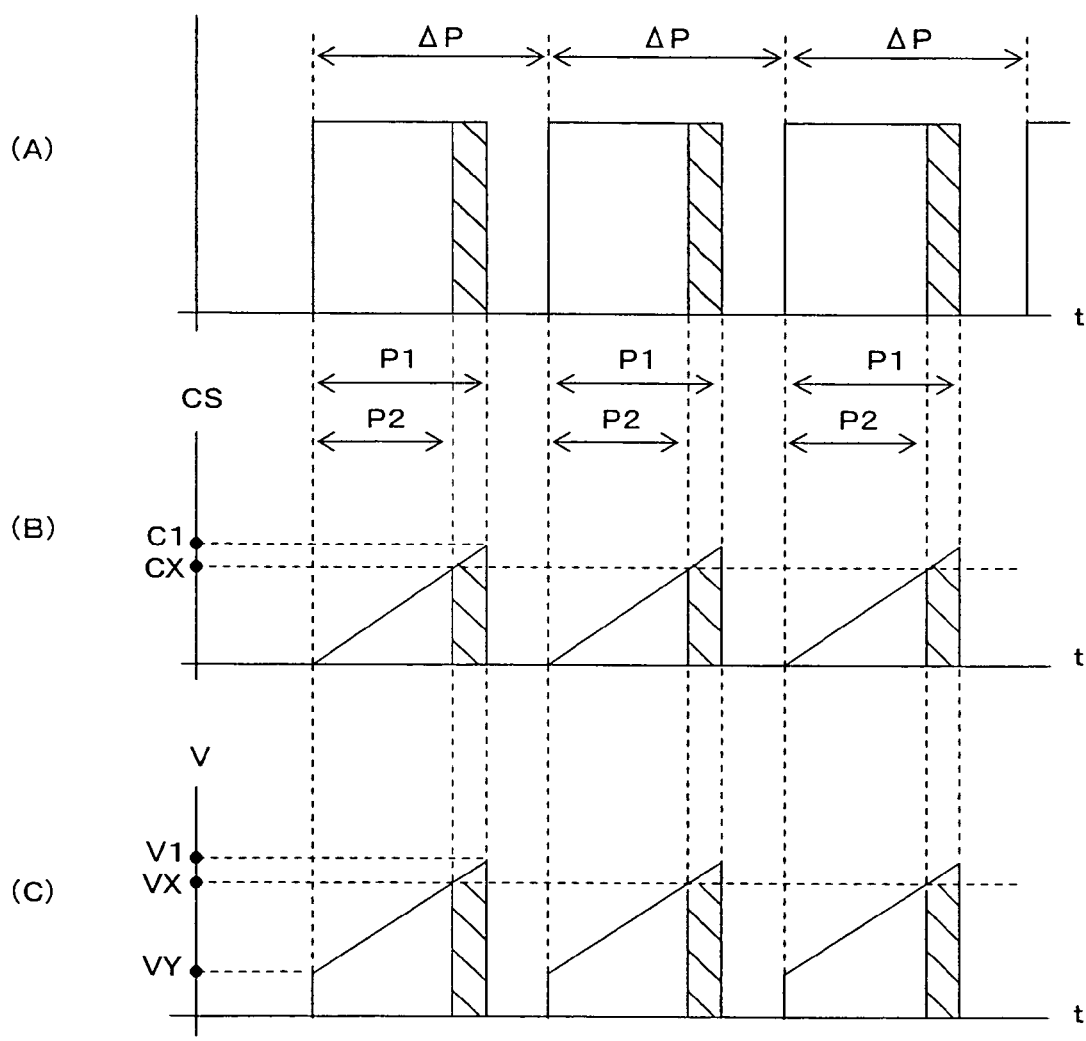
FIG. 6(A) to (C) show circumstances wherein a duty ratio is restricted by a limiter function of a PWM controlling circuit.

FIG. 6 shows examples of the relationship between the PWM control signals output from the PWM controlling circuit 16 and the voltage that is input to the limiter terminal 16b at that time. FIG. 6(A) shows PWM control signals. In these PWM control signals, a fundamental period is ΔP, and the pulse width that is output from the PWM controlling circuit 16 is P1. That is, the on-period of the MOSFET 18 per each fundamental period ΔP is P1, and the duty ratio is P1/ΔP. The PWM controlling circuit 16 increases or decreases the duty ratio based on the commands from the voltage comparing circuit 15, and creates and outputs the PWM control signals shown in FIG. 6(A).

FIG. 6(B) shows the current CS flowing through the MOSFET 18 in response to the PWM control signals of FIG. 6(A). This is the current flowing through the primary winding 22 of the transformer 20. As shown in FIG. 6(B), the current flowing through the MOSFET 18 increases approximately linearly while the MOSFET 18 is 'on'. This is due to inductance of the transformer 20. The longer the on-period of the MOSFET 18, the higher the peak value of the current CS flowing through the MOSFET 18. When the on-period of the MOSFET 18 is P1, the peak value of the current CS flowing through the MOSFET 18 is C1.

FIG. 6(C) shows the voltage that is input to the limiter terminal 16b in response to FIG. 6(A) and FIG. 6(B). That is, this is the voltage VB at the node B. The voltage that is input to the limiter terminal 16b increases in proportion with the current flowing through the MOSFET 18. A bias voltage VY is added to this voltage. The pulse output of the PWM control signals is cut at the point when the voltage that is input to the limiter terminal 16b reaches the limiter voltage VX. That is, the limiter operates. In the case shown in FIG. 6, the pulse output is restricted to a pulse width P2, and the hatched portions in the figure are restricted. By this means, the current value flowing through the MOSFET 18 is restricted to CX. At this point, the actual duty ratio becomes P2/ΔP. The current CS flowing through the MOSFET 18 is restricted, thus restricting the power that the MOSFET 18 causes to flow.

In the charging device 4, the current CS flowing through the MOSFET 18 is returned to the PWM controlling circuit 16 by means of the voltage VB at the node B. The MOSFET 18 is turned 'off' when the value of the voltage VB at the node B reaches the limiter voltage VX. The current CS flowing through the MOSFET 18 is thus restricted up to the current at the time when the value of the voltage VB at the node B reaches the limiter voltage VX.

As shown in FIG. 5, in the case where the power supply voltage is 180V (L in FIG. 5), the voltage VB at the node B reaches the limiter voltage VX when a current having the value CS1 is flowing through the MOSFET 18. That is, the current CS flowing through the MOSFET 18 is restricted to be equal to or below CS1 when the power supply voltage is 180V. Further, in the case where the power supply voltage is 220V (M in FIG. 5), the voltage VB at the node B reaches the limiter voltage VX when a current having the value CS2 is flowing through the MOSFET 18. That is, the current CS flowing through the MOSFET 18 is restricted to be equal to or below CS2 when the power supply voltage is 220V. Further, in the case where the power supply voltage is 260V (H in FIG. 5), the voltage VB at the node B reaches the limiter voltage VX when a current having the value CS3 is flowing through the MOSFET 18. That is, the current CS flowing through the MOSFET 18 is restricted to be equal to or below CS3 when the power supply voltage is 260V.

Figure 3:
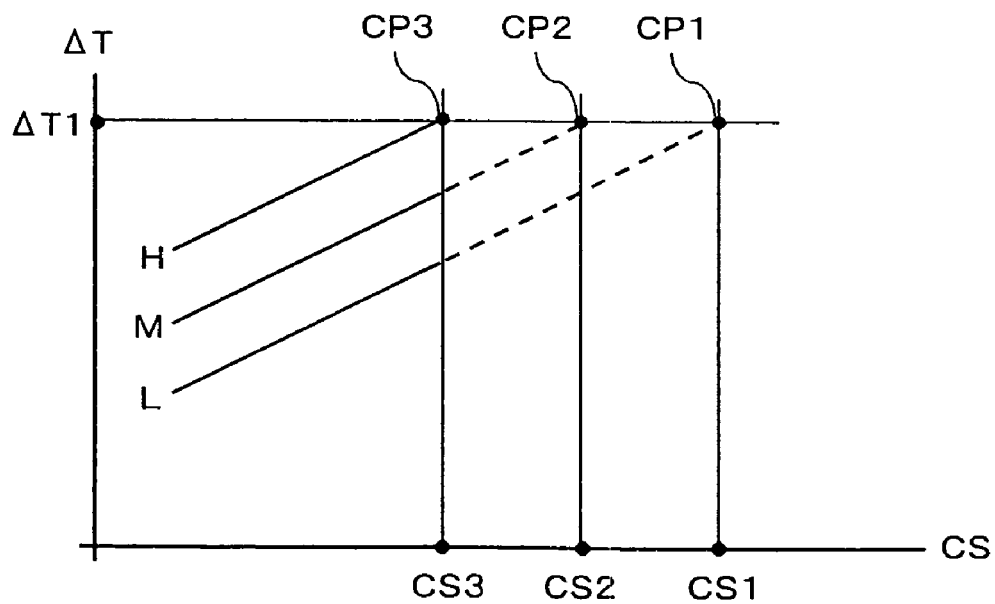
FIG. 3 is a graph showing the relationship between the current flowing through the MOSFET and the amount of temperature increase of the MOSFET.

FIG. 3 shows the current CS flowing through the MOSFET 18 on the horizontal axis and shows an amount of temperature increase ΔT of the MOSFET 18 on the vertical axis. 'L' in the figure shows a case where the power supply voltage is 180V, 'M' shows 220V, and 'H' shows 260V. The MOSFET 18 permits the amount of temperature increase ΔT to increase to a boundary value ΔT1. Moreover, the current CS shown in the figure is a peak value that is flowing through the MOSFET 18 when the MOSFET 18 is being controlled by the PWM controls.

As shown in FIG. 3, when the power supply voltage is 180V, the amount of temperature increase ΔT of the MOSFET 18 is restricted to be equal to or below the temperature increase boundary ΔT1 by restricting the peak value of the current CS flowing through the MOSFET 18 to be equal to or below the current value CS1. When the power supply voltage is 220V, the amount of temperature increase ΔT of the MOSFET 18 is restricted to be equal to or below ΔT1 by restricting the peak value of the current CS flowing through the MOSFET 18 to be equal to or below the current value CS2. When the power supply voltage is 260V, the amount of temperature increase ΔT of the MOSFET 18 is restricted to, be equal to or below ΔT1 by restricting the peak value of the current CS flowing through the MOSFET 18 to be equal to or below the current value CS3.

The charging device 4 restricts the peak value of the current CS flowing through the MOSFET 18 to be equal to or below the current value CS1 when the power supply voltage is 180V. The amount of temperature increase ΔT of the MOSFET 18 is thus restricted to be equal to or below the temperature increase boundary ΔT1. When the power supply voltage is 220V, the peak value of the current CS flowing through the MOSFET 18 is restricted to be equal to or below the current value CS2. The amount of temperature increase ΔT of the MOSFET 18 is thus restricted to be equal to or below ΔT1. When the power supply voltage is 260V, the peak value of the current CS flowing through the MOSFET 18 is restricted to be equal to or below the current value CS3. The amount of temperature increase ΔT of the MOSFET 18 is thus restricted to be equal to or below ΔT1. Thus, no matter whether the power supply voltage is 180V, 220V, or 260V, the charging device 4 restricts the current CS flowing through the MOSFET 18 to be equal to or below a current which causes the temperature of the MOSFET 18 to rise no further than ΔT1. It is possible, in the charging device 4, to suppress ΔT of the MOSFET 18 to be equal to or below ΔT1 irrespective of the power supply voltage.

Figure 2:
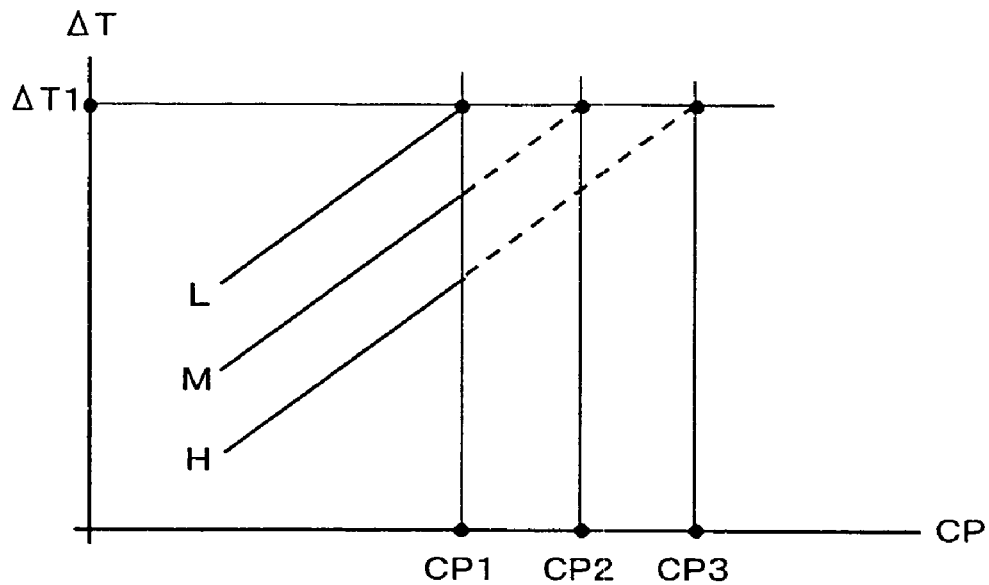
FIG. 2 is a graph showing the relationship between the power flowing through a MOSFET and an amount of temperature increase of the MOSFET.

FIG. 2 shows power sent to the transformer 20 by the MOSFET 18 on the horizontal axis, and shows the amount of temperature increase ΔT of the MOSFET 18 on the vertical axis. 'L' in the figure shows a case where the power supply voltage is 180V, 'M' shows 220V, and 'H' shows 260V. In the charging device 4, the MOSFET 18 sends a charging power to the transformer 20 up to CP1 in the case where the voltage is 180V, up to CP2 where the voltage is 220V, and up to CP3 where the voltage is 260V. In this manner, charging power is not restricted uniformly by the rated power in the charging device 4. Instead, it is possible to change the boundary values of the charging power depending on the power supply voltage. In any voltages, the amount of temperature increase ΔT of the MOSFET 18 is restricted to be equal to or below ΔT1 irrespective of the power supply voltage.

Figure 7:
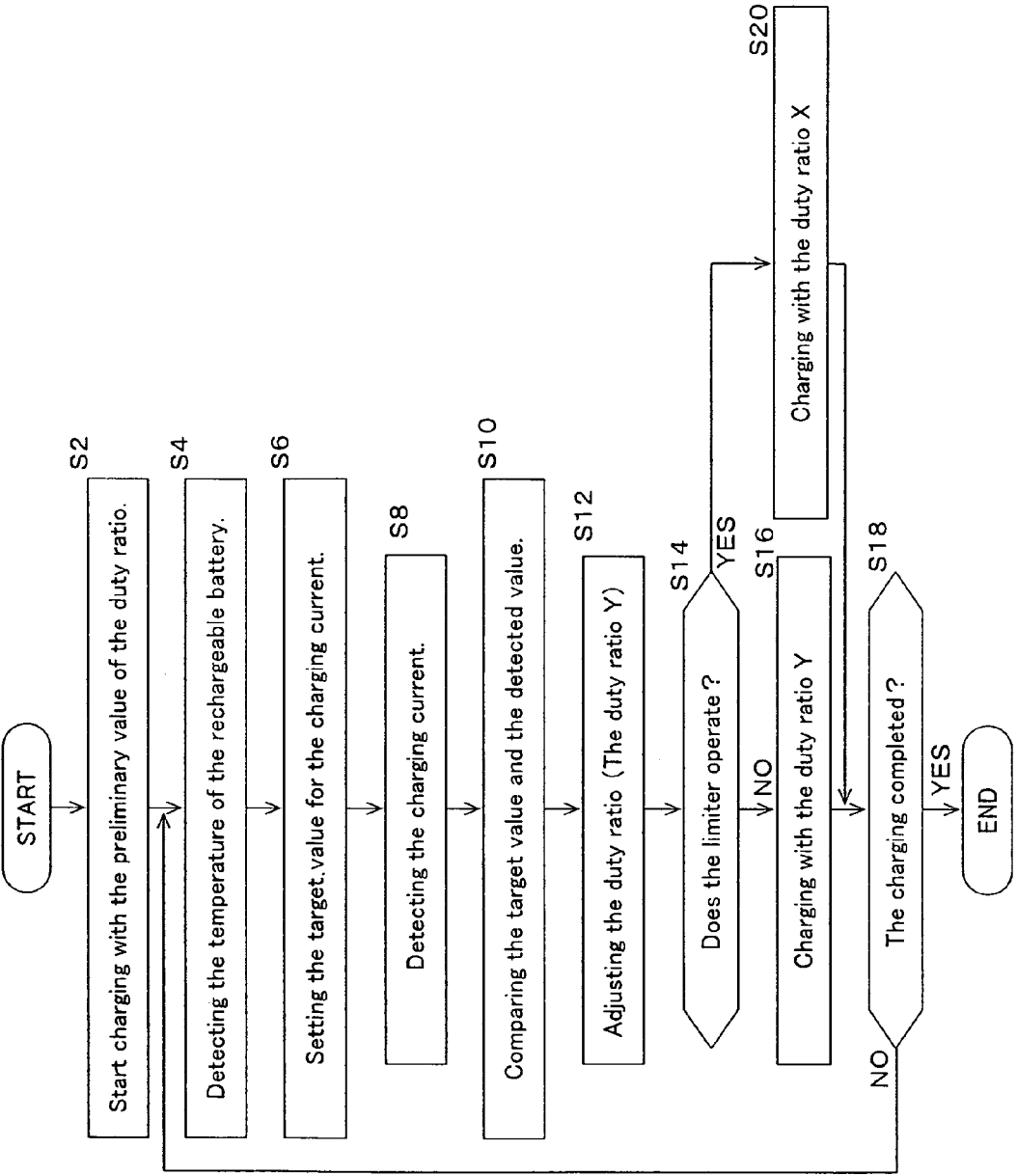
FIG. 7 is a flowchart showing the sequence of operation of the charging device of Embodiment 1.

The sequence of operations of the charging device 4 will be described. FIG. 7 is a flowchart showing the sequence of operations of the charging device 4. The operations of the charging device 4 are started by connecting the power supply plug 6 with the alternating current supply 2 and by connecting the battery pack 40 with the charging device 4.

At step S2, the flow of charging current is started by using a preliminary value of the duty ratio.

At step S4, the temperature of the rechargeable battery 42 is detected. The microcomputer 14 detects the temperature of the rechargeable battery 42 from the divided voltage between the thermistor 44 and the resistor 38. Furthermore, the microcomputer 14 calculates the speed of temperature change of the rechargeable battery 42.

At step S6, the target value for the charging current is set. The microcomputer 14 finds, from the temperature of the rechargeable battery 42 and the speed of temperature change thereof, the greatest charging current that the rechargeable battery 42 will permit. At this juncture, a two-dimensional map describing charging currents corresponding to pairs of values concerning the temperature of the rechargeable battery 42 and the speed of temperature change thereof may be referred by the microcomputer 14. The greatest charging currents that the rechargeable battery 42 permits under its temperature state are described in the two-dimensional map. The rechargeable battery 42 will not be abnormally heated if it is charged by using a charging current equal to or below these charging currents. The microcomputer 14 outputs, to the voltage comparing circuit 15, a voltage which corresponds to the charging current that has been set.

At step S8, the charging current is detected. That is, the voltage across the resistor 36 is input to the voltage comparing circuit 15.

At step S10, the detected value of the charging current and the target value for the charging current are compared. That is, the voltage comparing circuit 15 compares the voltage across the resistor 36 (step S8) and the output voltage of the microcomputer 14 (step S6). Based on the results of comparison, the voltage comparing circuit 15 commands the PWM controlling circuit 16 to increase or decrease the duty ratio. These commands are input to the PWM controlling circuit 16 via the photocoupler 30. In the case where the detected value is higher, the voltage comparing circuit 15 decreases the duty ratio. In the case where the target value is higher, the voltage comparing circuit 15 increases the duty ratio.

At step S12, the duty ratio is adjusted so that the charging current becomes that of the target value that was set in step S6. The PWM controlling circuit 16 increases or decreases the duty ratio based on the commands from the voltage comparing circuit 15. The duty ratio at this juncture is a duty ratio Y. The duty ratio Y causes the greatest charging current to flow through the rechargeable battery 42. The greatest charging current is the maximum current accepted by the secondary battery 42 without causing abnormal heating of the rechargeable battery 42.

At step S14, the limiter of the PWM controlling circuit 16 might or might not operate. The MOSFET 18 is turned 'on' based on the duty ratio that was increased or decreased in step S12. As shown in FIG. 6, the current CS flowing through the MOSFET 18 increases while the MOSFET 18 is 'on'. The limiter will operate if the current CS flowing through the MOSFET 18 reaches the current value at which the limiter operates. The limiter does not operate if the current CS flowing through the MOSFET 18 does not reach the current value at which the limiter operates. If the limiter operates, the process proceeds to step S20. If the limiter does not operate, the process proceeds to step S16.

At step S16, charging operation proceeds based on the duty ratio Y that was increased or decreased in step S12. By adjusting the duty ratio of the MOSFET 18 to be the duty ratio Y, the charging device 4 performs charging operation by using the greatest charging current that the rechargeable battery 42 will permit.

At step S20, charging is performed using a duty ratio differing from the duty ratio Y. This is a duty ratio X. In the duty ratio X the on-period is restricted by means of the limiter of the PWM controlling circuit 16. At this juncture, the current flowing through the MOSFET 18 is restricted to be equal to or below a current value that causes the temperature of the MOSFET 18 to rise only as far as the temperature increase boundary $\Delta T1$. At step S20, the charging device 4 adjusts the charging power so that the amount of temperature increase of the MOSFET 18 is restricted to be equal to or below the temperature increase boundary $\Delta T1$. Next, the process proceeds to step S18.

At step S18, it is determined whether the charging operation of the rechargeable battery 42 has been completed. If charging operation has been completed, the process ends. If charging operation has not been completed, the process returns to step S4. Charging operation continues by using this sequence until the rechargeable battery 42 is fully charged.

Figure 8:
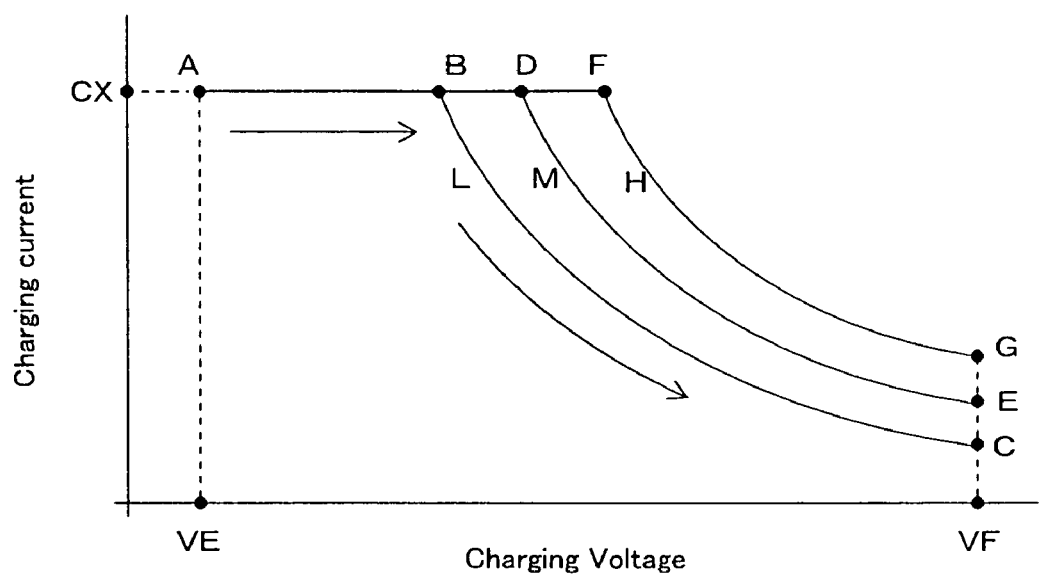
FIG. 8 shows the relationship between charging current and charging voltage during charging operation.

FIG. 8 shows an example of a relationship between the charging current and the charging voltage while the battery pack 40 is charged by means of the sequence described above. In the figure, the solid line 'L' joining the points A, B, and C shows a case where the power supply voltage is 180V. The solid line 'M' joining the points A, D, and E shows a case where the power supply voltage is 220V. The solid line 'H' joining the points A, F, and G shows a case where the power supply voltage is 260V. The voltage of the rechargeable battery 42 is VE at the time when charging operation begins, and is VF at the time when charging operation ends. The voltages VE and VF are the voltages of the rechargeable battery 42, and do not have direct relation to the power supply voltage.

The case where the power supply voltage is 180V will now be described. Point A shows the relationship between the charging current and the charging voltage at the time when charging operation begins. As the charging operation progresses, the relationship between the charging current and the charging voltage moves from point A to point B. The charging voltage is low at the preliminary charging period. The lower the charging voltage, the greater the allowable current by the MOSFET 18. If the allowable current by the MOSFET 18 is supplied to the battery 42 at the preliminary charging period, the battery 42 is overheated. In the preliminary charging period, the maximum currents accepted by the battery 42 is lower than the maximum currents permitted by the MOSFET 18. That is, charging power is restricted, between point A and point B, to a quantity based on the charging current that the rechargeable battery 42 permits. At the preliminary charging period, charging operation is performed by using the charging current CX which the rechargeable battery 42 permits. At this juncture, the MOSFET 18 is switched by the duty ratio Y in step S16 of FIG. 7. A cycle of step S4, step S6, step S8, step S10, step S12, step S14, step S16, step S18 is repeated at the preliminary charging period. By repeating the cycle, the battery voltage increases from point A to point B. The charging power increases as charging operation progresses.

As charging operation progresses, the relationship between the charging current and the charging voltage changes to the relationship shown by the curved line BC. The charging power is fixed during the period from point B to point C. This shows that the current CS flowing through the MOSFET 18 is restricted by the limiter of the PWM controlling circuit 16. Since the power supply voltage is 180V, the boundary value of the current CS at point B is CS1 shown in FIGS. 3 and 5. The amount of temperature increase $\Delta T$ of the MOSFET 18 consequently becomes $\Delta T1$, which is the boundary permitted by the MOSFET 18. By this means, charging operation is performed by using boundary charging power within which the charging device 4 can be used safely. Moreover, since the current CS is restricted up to the boundary value CS1 because the power supply voltage is 180V, the MOSFET 18 causes the flow of power CP1. After point B, step S14 in the flowchart of FIG. 7 is usually YES. A cycle of step S4, step S6, step S8, step S10, step S12, step S14, step S20, and step S18, is repeated between point B and point C. Between point B and point C, the charging power is kept at CP1 shown in FIG. 2.

The case where the power supply voltage is 220V will now be described. As with the case where the power supply voltage is 180V, charging current is restricted at its upper value CX so as to protect the rechargeable battery 42 from overheating. As charging operation progresses and the charging power increases, the relationship between the charging current and the charging voltage changes to the relationship shown by the curved line DE. Between point D and point E, the charging power is maintained at the value CP2 shown in FIG. 2. That is, the current CS flowing through the MOSFET 18 is restricted by the limiter of the PWM controlling circuit 16 so that the charging power is maintained regardless the increase of the charging voltage. Since the power supply voltage is 220V, the boundary value of the current CS at point D is CS2 shown in FIGS. 3 and 5. The amount of temperature increase $\Delta T$ of the MOSFET 18 becomes $\Delta T1$, which is the boundary permitted by the MOSFET 18. By this means, charging is performed by using boundary charging power within which the charging device 4 can be used safely. Moreover the MOSFET 18 causes the flow of power CP2 shown in FIG. 2.

The case where the power supply voltage is 260V will now be described. As with the case where the power supply voltage is 180V, charging current is restricted at its upper value CX so as to protect the rechargeable battery 42 from overheating. As charging operation progresses and the charging power increases, the relationship between the charging current and the charging voltage changes to the relationship shown by the curved line FG. Between point F and point G, the charging power is maintained at the value CP3 shown in FIG. 2. That is, the current CS flowing through the MOSFET 18 is restricted by the limiter of the PWM controlling circuit 16 so that the charging power is maintained regardless the increase of the charging voltage. Since the power supply voltage is 260V, the boundary value of the current CS at point F is CS3 shown in FIGS. 3 and 5. The amount of temperature increase $\Delta T$ of the MOSFET 18 becomes $\Delta T1$, which is the boundary permitted by the MOSFET 18. By this means, charging is performed by using boundary charging power within which the charging device 4 can be used safely. Moreover the MOSFET 18 causes the flow of power CP3 shown in FIG. 2.

The charging device 4 is capable of adjusting the charging power so that the amount of temperature increase $\Delta T$ of the MOSFET 18 becomes equal value irrespective of whether the power supply voltage is 180V, 220V, or 260V. The charging device 4 is capable of restricting the amount of temperature increase $\Delta T$ of the MOSFET 18 to be equal to or below the temperature increase boundary $\Delta T1$ irrespective of the differing power supply voltages. Consequently, it is possible—within the boundaries permitting the charging device to be used safely—to perform charging operation by using the largest charging current as possible.

In the charging device 4, charging operation is performed by using the greatest charging current that the rechargeable battery 42 will permit during the preliminary charging period (the period in which the charging voltage is low). Charging power increases as the charging operation proceeds, and reaches the greatest charging power that the MOSFET 18 will permit from the viewpoint of temperature increase of the MOSFET 18, and then charging operation is performed while this charging power is maintained at the greatest charging power. Irrespective of differing power supply voltage, the charging device 4 can perform charging operation by using a boundary charging power which permits the charging device to be used safely. The charging device is always used under the permissible power from the beginning to the completion of charging. The permissible power is determined from the permissible temperature increase of the MOSFET 18 and changes depending on the power supply voltage. In this charging device, charging power is not restricted unnecessarily, unlike the prior art charging devices which are limited by the rated power.

In the above description, cases were described where the power supply voltages were 180V, 220V, and 260V. However, the power supply voltage is not restricted to these voltages. It is possible, by selecting the resistance of the resistors 72, 78, 80, and 82, to realize a charging device that achieves the same results, with-varying power supply voltages.

Embodiment 2

Figure 9:
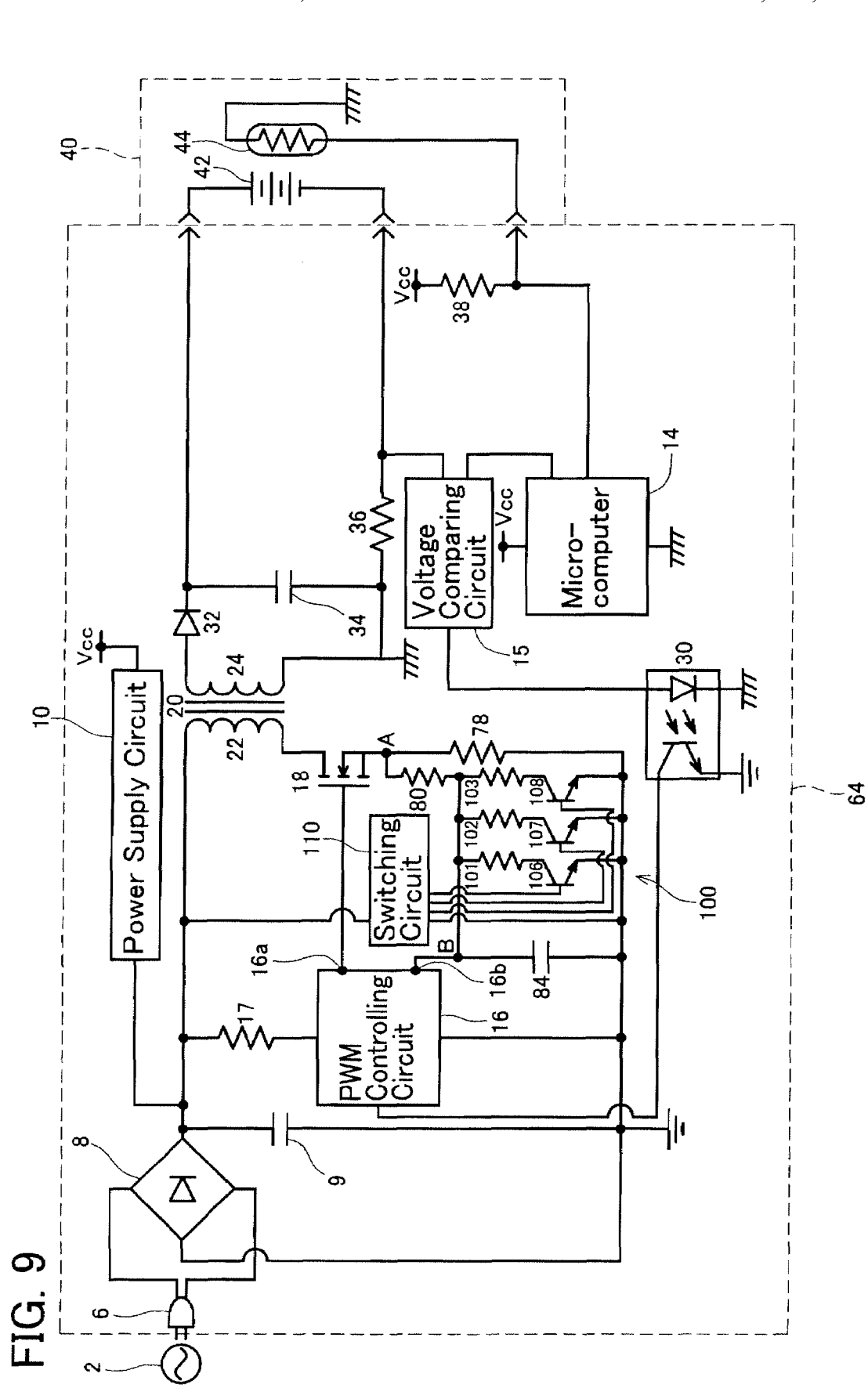
FIG. 9 shows the configuration of a charging device of Embodiment 2.

A charging device 64 of Embodiment 2 is described referring to figures. FIG. 9 shows the circuit configuration of the charging device 64 of Embodiment 2. In FIG. 9, a battery pack 40 is connected with the charging device 64. A portion of the charging device 64 has an identical configuration and operation as the charging device 4 of Embodiment 1. Consequently, the same reference numbers are assigned thereto and an explanation thereof is omitted.

As shown in FIG. 9, the charging device 64 is provided with a variable resistance circuit 100, and a switching circuit 110 for controlling the variable resistance circuit 100. The variable resistance circuit 100 is a circuit in which a resistor 101, a resistor 102, and a resistor 103 are connected in parallel. The relationship between the resistance of the resistors 101, 102, and 103 is as follows: 101<102<103. Furthermore, switching elements 106, 107, and 108 are interposed between the resistors 101, 102, and 103 and GRD respectively. It is possible to change the resistance of the variable resistance circuit 100 by selectively switching the switching elements 106, 107, and 108. The switching elements 106, 107, and 108 are selectively switched by the switching circuit 110. The switching circuit 110 can recognize the power supply voltage, and switches the switching elements 106, 107, and 108 in response to this power supply voltage. For example, if the power supply voltage is 180V, the switching circuit 110 switches 'on' only the switching element 106. If the power supply voltage is 220V, the switching circuit 110 switches 'on' only the switching element 107. If the power supply voltage is 260V, the switching circuit 110 switches 'on' only the switching element 108.

Figure 10:
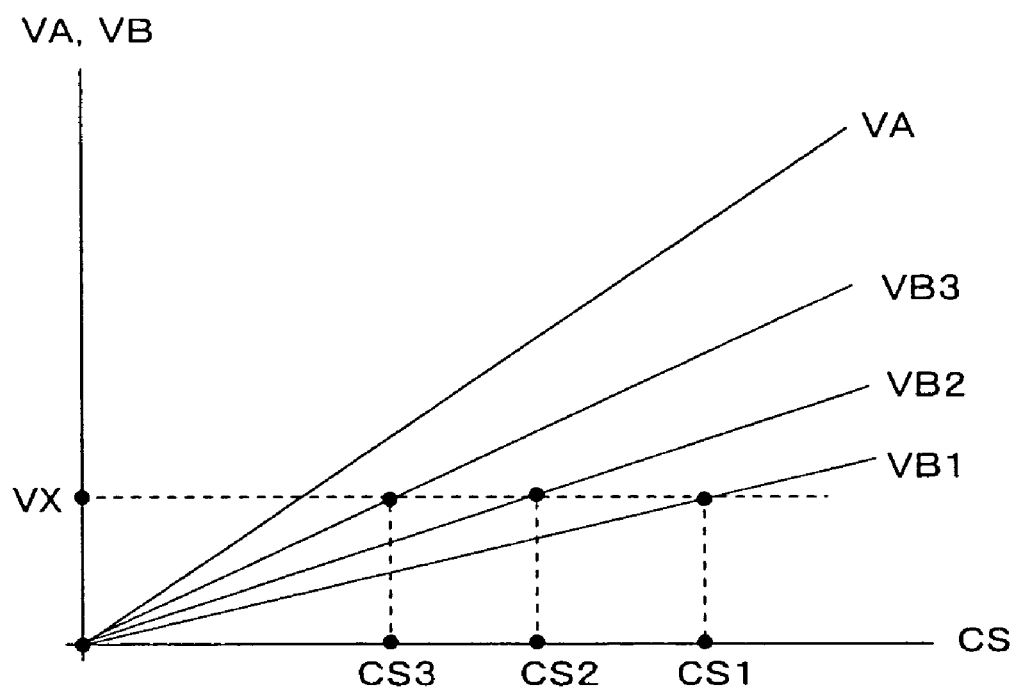
FIG. 10 is a graph showing voltage divided by a variable resistance circuit and the first resistor.

In this charging device 64, as shown in FIG. 9, the first resistor 80 and the variable resistance circuit 100 are connected in series, and the series circuit of the first resistor 80 and the variable resistance circuit 100 is connected in parallel with the resistor 78. By this means, the voltage VA at the node A is divided by the first resistor 80 and the variable resistance circuit 100. The value of this divided voltage can be determined by the voltage VB at the node B of FIG. 9. FIG. 10 shows both the voltage VA at the node A and the voltage VB at the node B with respect to the charging current CS. VB1 in the figure shows the case where the power supply voltage is 180V and only the switching element 106 is turned 'on'. VB2 shows the case where the power supply voltage is 220V and only the switching element 107 is turned 'on'. VB3 shows the case where the power supply voltage is 260V and only the switching element 108 is turned 'on'. The higher the power supply voltage, the higher the voltage VB at the node B, even if the current CS flowing through the MOSFET 18 remains fixed. That is, the higher the power supply voltage, the higher the dividing voltage rate k shown by VB=k·VA.

As shown in FIG. 10, the voltage VB at the node B changes due to the power supply voltage even if the current CS flowing through the MOSFET 18 remains fixed. Put differently, the current CS flowing through the MOSFET 18 changes due to the power supply voltage even if the voltage VB at the node B remains the same. In FIG. 10, in the case where, for example, the power supply voltage is 180V, the voltage VB at the node B reaches the voltage value VX when a current having the value CS1 is flowing through the MOSFET 18. In the case where the power supply voltage is 220V, the voltage VB at the node B reaches the voltage value VX when a current having the current value CS2 is flowing through the MOSFET 18. In the case where the power supply voltage is 260V, the voltage VB at the node B reaches the voltage value VX when a current having the current value CS3 is flowing through the MOSFET 18.

The resistance of the resistors 78, 82, 101, 102, and 103 is selected, in the charging device 64, so that the relationship between the current CS flowing through the MOSFET 18 and the voltage VB at the node B will have the relationship shown in FIG. 10.

In the charging device 64, the voltage VB at the node B is input to the limiter terminal 16b. The limiter of the PWM controlling circuit 16 operates when the voltage input to the limiter terminal reaches the limiter voltage VX. In the charging device 64, as in the charging device 4 of embodiment 1, the current CS flowing through the MOSFET 18 is restricted to be equal to or below CS1 when the power supply voltage is 180V. Further, the current CS flowing through the MOSFET 18 is restricted to be equal to or below CS2 when the power supply voltage is 220V, and is restricted to be equal to or below CS3 when the power supply voltage is 260V.

The charging device 64 performs charging operation, like the charging device 4, by using the sequence shown in FIG. 7. At this juncture, the current CS flowing through the MOSFET 18 is restricted to the same restricting values as in the charging device 4. By this means, as with the charging device 4, the charging current and the charging voltage during charging operation share the relationship shown in FIG. 8. The charging device 64 is capable of performing charging operation by using the largest charging current as possible—within the boundaries of the temperature increase of the MOSFET 18 from the beginning to the completion of charging—irrespective of whether the power supply voltage is 180V, 220V, or 260V.

Cases were described where the charging device 64 responded to power supply voltages of 180V, 220V, and 260V. However, power supply voltage is not restricted to these voltages. It is possible to make the charging device 64 respond to the power supply voltage being used by changing the resistances used in the variable resistance circuit 100. One variable resistance element may also be utilized instead of a plurality of resistances. By this means, it is possible to realize the charging device 64 that responds to various power supply voltages.

Embodiment 3

Figure 11:
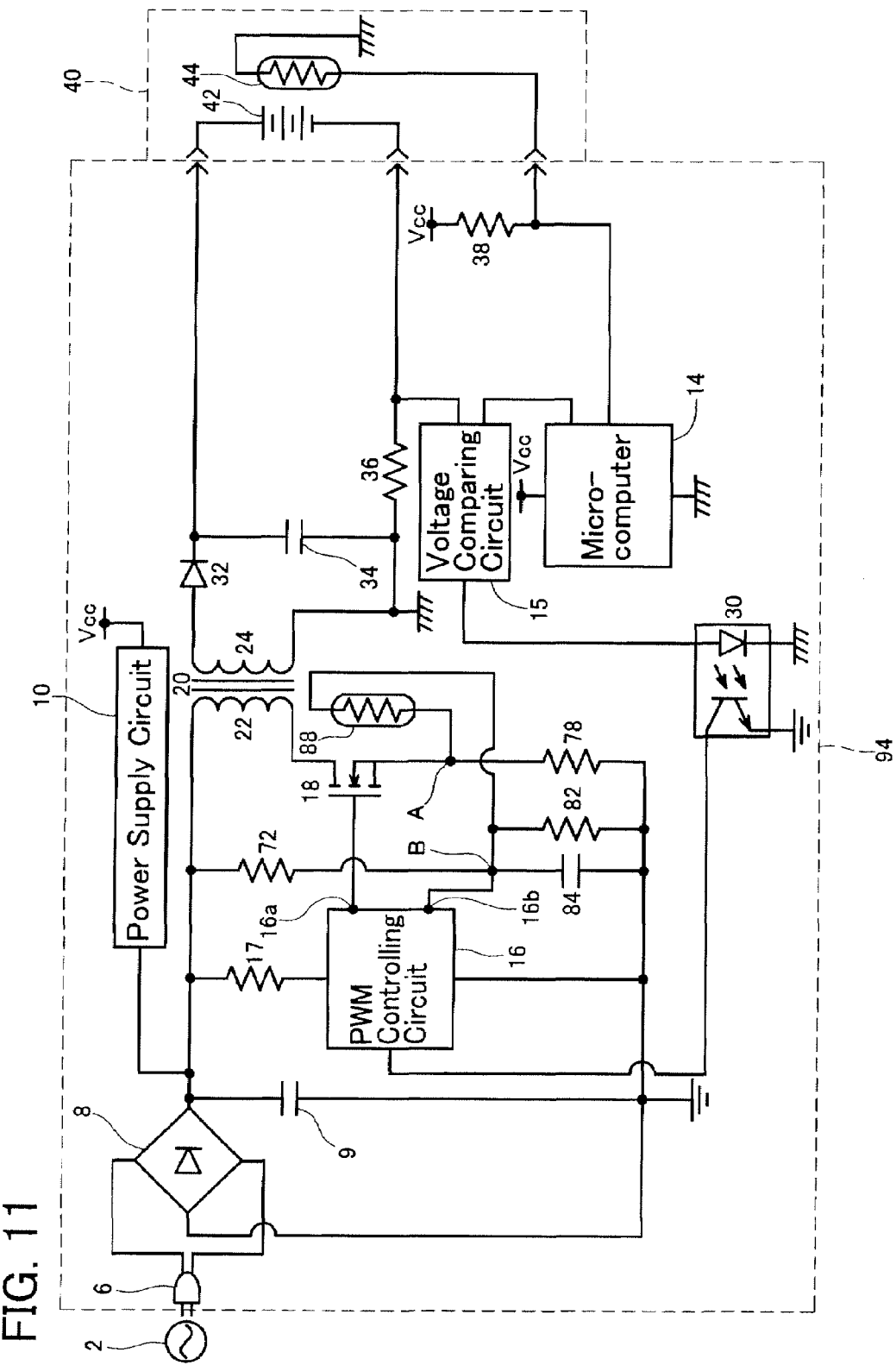
FIG. 11 shows the configuration of a charging device of Embodiment 3.

A charging device 94 of Embodiment 3 is described referring to figures. FIG. 11 shows the circuit configuration of the charging device 94 of Embodiment 3. In FIG. 11, the battery pack 40 is connected with the charging device 94. A portion of the charging device 94 has an identical configuration and operation as the charging device 4 of Embodiment 1. Consequently, the same reference numbers are assigned thereto and an explanation thereof is omitted.

As shown in FIG. 11, the charging device 94 is provided with a thermistor 88 located in the vicinity of the MOSFET 18. The thermistor 88 has the negative characteristic that its resistance falls as its temperature increases. The temperature of the thermistor 88 is approximately the same as the temperature of the MOSFET 18.

In the charging device 94, the circuit, in which the thermistor 88 and the second resistor 82 are connected in series, is connected in parallel with the resistor 78. By this means, the voltage VA at the node A is divided by the thermistor 88 and the second resistor 82. The dividing voltage rate by the thermistor 88 and the second resistor 82 changes when the temperature of the thermistor 88 changes.

Figure 12:
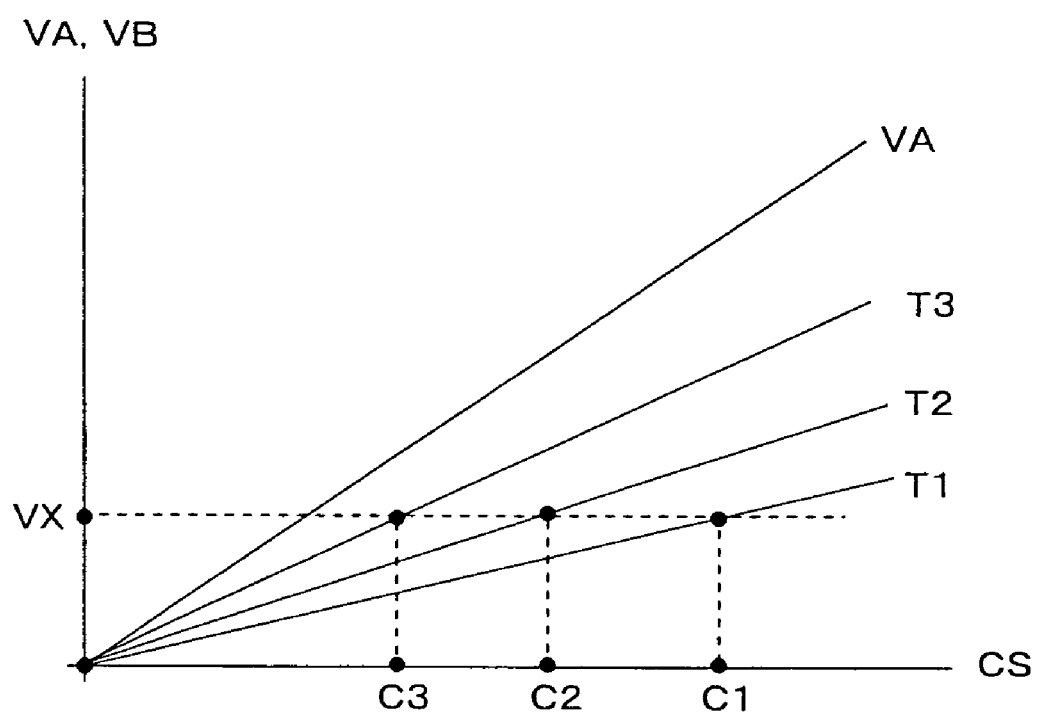
FIG. 12 shows voltage divided by a thermistor and the second resistor.

FIG. 12 shows both the voltage VA at the node A and the voltage VB at the node B with respect to the charging current. T1 in the figure shows the voltage VB at the node B in the case where the temperature of the thermistor 88 is T1. T2 shows the voltage VB at the node B in the case where the temperature of the thermistor 88 is T2. T3 shows the voltage VB at the node B in the case where the temperature of the thermistor 88 is T3. The relationship between the temperatures is as follows: T1<T2<T3.

As shown in FIG. 12, the higher the temperature of the thermistor 88, the higher the voltage VB at the node B, even if the current CS flowing through the MOSFET 18 remains fixed. That is, the higher the temperature of the thermistor 88, the higher the dividing voltage rate k shown by VB=k·VA. Put differently, the current CS flowing through the MOSFET 18 changes due to the temperature of the thermistor 88 even if the voltage VB at the node B remains the same. In FIG. 12, in the case where, for example, the temperature of the thermistor 88 is T1, the voltage VB at the node B reaches the voltage value VX when a current having the value CS1 is flowing through the MOSFET 18. In the case where the temperature of the thermistor 88 is T2, the voltage VB at the node B reaches the voltage value VX when a current having the current value CS2 is flowing through the MOSFET 18. In the case where the temperature of the thermistor 88 is T3, the voltage VB at the node B reaches the voltage value VX when a current having the value CS3 is flowing through the MOSFET 18.

Since the thermistor 88 is located in the vicinity of the MOSFET 18, the temperature of the thermistor 88 and the MOSFET 18 are usually approximately equal. Consequently, the relationship between the temperature of the thermistor 88 and the voltage VB at the node B, as described above, is also the relationship between the temperature of the MOSFET 18 and the voltage VB at the node B.

In the charging device 94, as well, the voltage VB at the node B is input to the limiter terminal 16b. In the charging device 94, the voltage VB at the node B changes due to the temperature of the MOSFET 18 even if the current CS flowing through the MOSFET 18 remains the same. As the temperature of the MOSFET 18 rises, the voltage VB at the node B reaches the limiter voltage VX, although the current CS flowing through the MOSFET 18 is low. That is, the current CS flowing through the MOSFET 18 is restricted to a low value while the temperature of the MOSFET 18 is high. Heating of the MOSFET 18 is suppressed by restricting the current CS flowing through the MOSFET 18 to a low value. Conversely, if the temperature of the MOSFET 18 is low, the MOSFET 18 permits the flow of a high current. The MOSFET 18 becomes greatly heated if the current CS flowing through the MOSFET 18 has a high value. In this manner, the MOSFET 18 permits heating when it has a low temperature, and suppresses heating when it has a high temperature. By this means, the temperature of the MOSFET 18 is maintained in the charging device 94 so as not to exceed a determined value.

FIG. 13(A) shows the relationship between the charging current and the charging voltage in the charging device 94 while the battery pack 40 is being charged. Further, FIG. 13(B) shows the temperature T of the MOSFET 18 during this time.

In FIG. 13(A), the solid line joining the points A, B, and C shows the relationship between the charging voltage and the charging current. At this time, the temperature of the MOSFET 18 is shown by the solid line joining the points E, F, and G in FIG. 13(B). The voltage of the rechargeable battery 42 is VE at the time when charging begins, and is VF at the time when charging ends.

Figure 13:
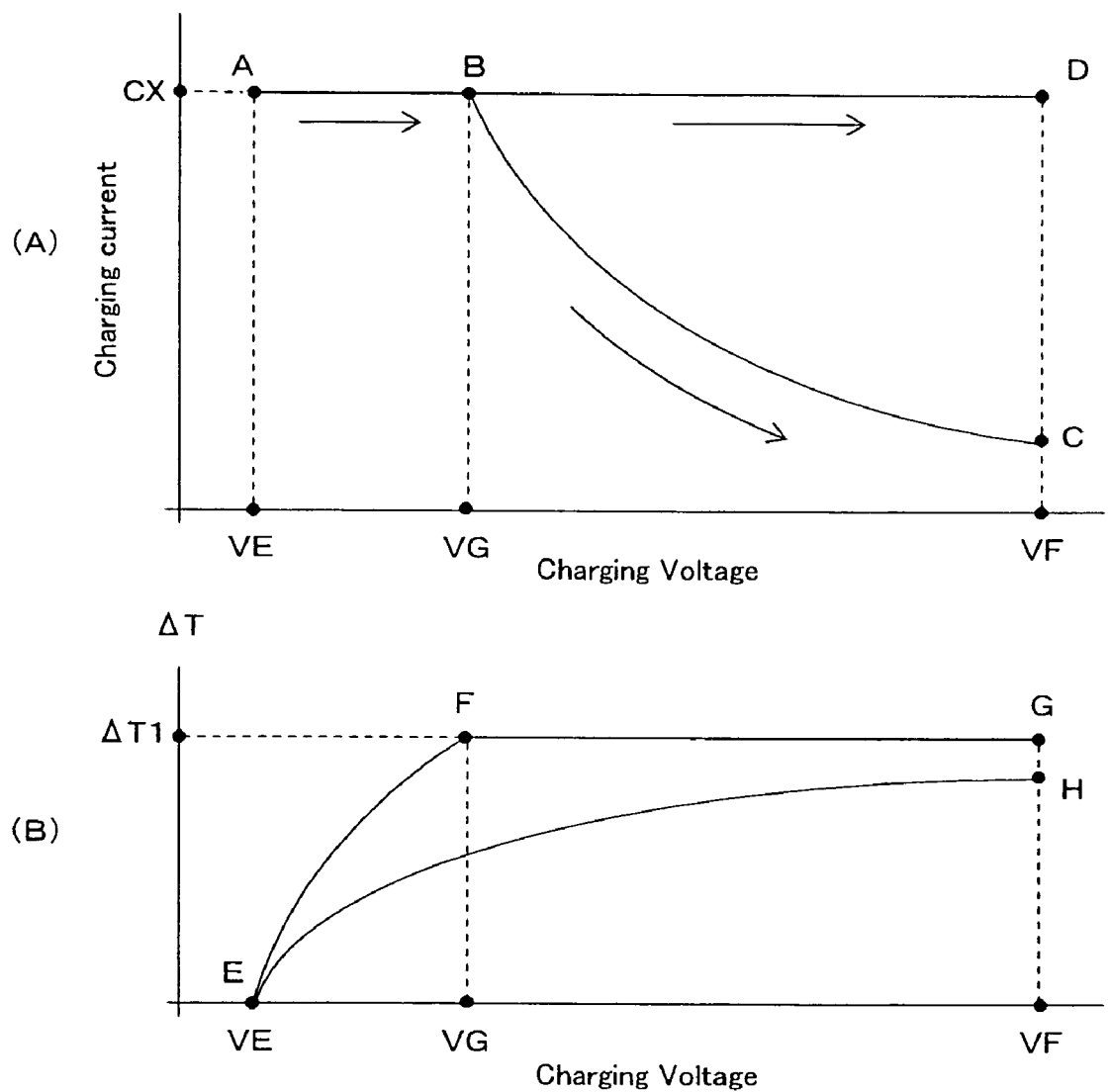
FIG. 13(A) shows the relationship between the charging current and the charging voltage during charging operation.
FIG. 13(B) shows the relationship between the temperature of the MOSFET and the charging voltage during charging operation.

At the preliminary charging period, in which the charging voltage is low, the MOSFET 18 allows a large charging current to flow through the MOSFET 18. However, the battery 42 will be overheated if this large current is supplied to the battery 42. The charging current is restricted by the computer 14 up to CX in FIG. 13 which is the maximum current accepted by the battery 42 without overheating of the battery 42. Consequently, as with the charging device 4 of Embodiment 1, charging power is restricted up to CX between point A and point B. Charging operation is performed by using the greatest charging current CX that the rechargeable battery 42 permits. The charging power increases as the charging operation proceeds because the charging voltage increases. As shown in FIG. 13(B), the temperature increase of the MOSFET 18 increases as the charging power increases.

At point B and F in FIG. 13, the charging power reaches the maximum power. At the maximum charging power, the temperature increase of the MOSFET 18 reaches the permissible maximum value ΔT1. In order to avoid overheating of the MOSFET 18, higher charging power should be avoided. After the reaching to point B and F, the charging power is maintained at this maximum value during the period from point B to point C. This is to maintain the temperature increase of the MOSFET 18 at the maximum permissible value ΔT1, as shown in FIG. 13(B). The temperature increase ΔT1 is a boundary temperature increase permitted by the MOSFET 18. Since the temperature increase of the MOSFET 18 is being maintained at ΔT1, the charging device 94 performs charging operation by using charging power that is restricted within a boundary that permits safe usage of the charger device.

Further, the temperature increase of the MOSFET 18 might not reach the boundary value ΔT1, as shown by the solid line joining point E and point H in FIG. 13(B). At this juncture, the limiter of the PWM controlling circuit 16 does not operate. As a result, the charging voltage and the charging current have the relationship shown by the solid line joining point A, point B, and point D in FIG. 13(A). That is, charging is performed, from the beginning to the completion of charging, at the charging current CX which is the greatest charging current the rechargeable battery 42 permits.

In this manner, in the charging device 94, charging power is restricted within the boundaries permitted by the rechargeable battery 42 up to the charging power at which the temperature increase of the MOSFET 18 reaches ΔT1. Consequently, the charging device 94 can perform charging operation by using a boundary power that permits safe usage of the charging device 94 to continue.

During the preliminary charging period (in which the charging voltage is low), the charging device 94 performs charging operation by using the charging current CX (the greatest charging current that the rechargeable battery 42 permits). The charging power increases as charging proceeds, the MOSFET 18 becomes heated until the boundary temperature ΔT1 is reached, and this temperature increase ΔT1 is then maintained while charging operation is continued. That is, charging operation is continued while the MOSFET 18 outputs the maximum boundary power. Furthermore, charging operation is performed throughout by using the greatest charging current CX that the rechargeable battery 42 permits if the temperature increase of the MOSFET 18 does not reach the boundary temperature increase ΔT1.

As shown above, the charging device 94 performs charging operation by using a boundary charging power at which the charging device may be used safely without overheating of the MOSFET 18. In this charging device 94, charging power is not restricted unnecessarily unlike the prior art charging devices which are restricted by the rated power. The charging device 94 is capable of performing charging operation by using the boundary charging power which permits safe usage of the charging device to continue safely from the beginning to the completion of charging irrespective of differing power supply voltages.

Embodiment 4

Figure 14:
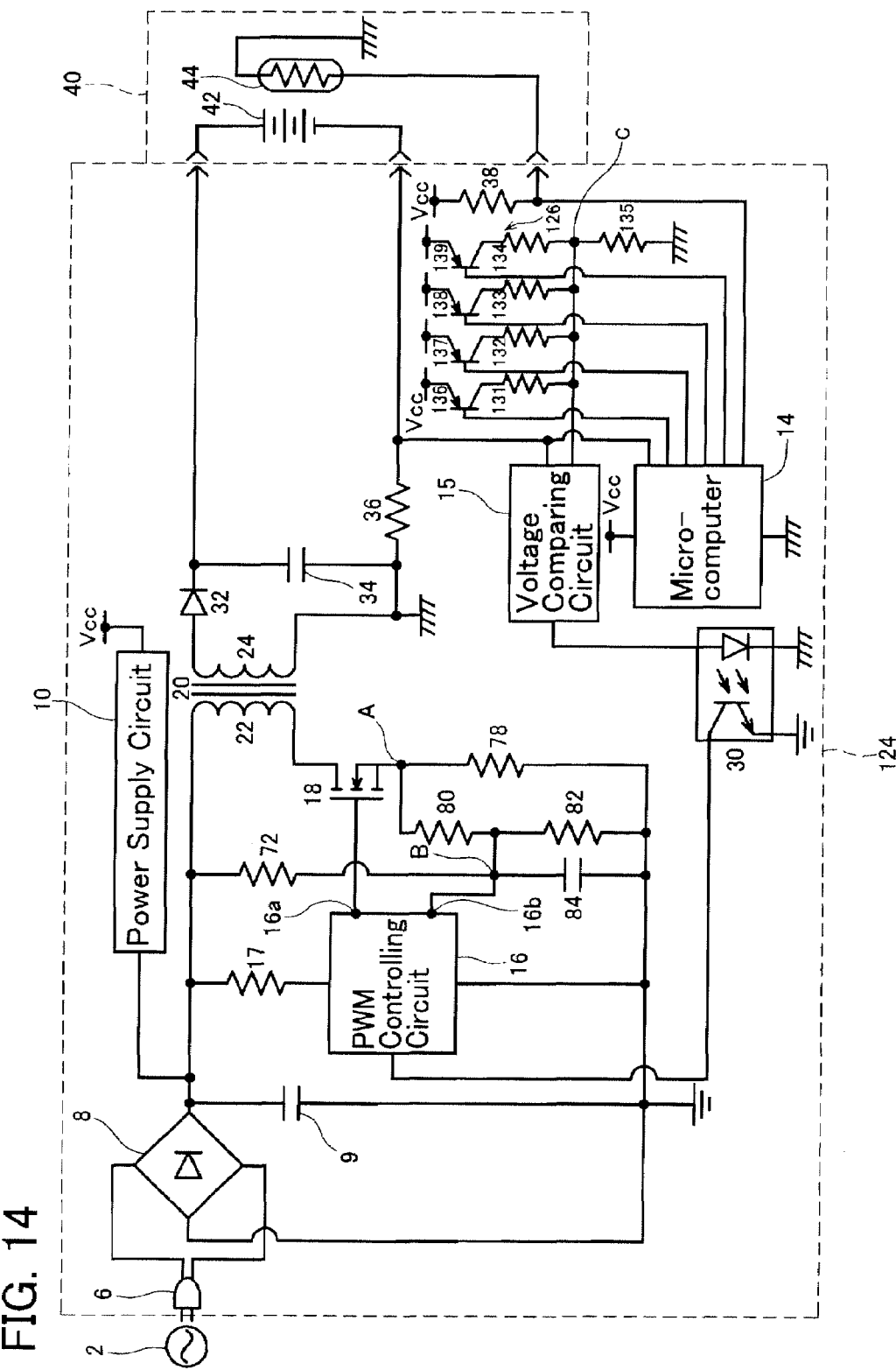
FIG. 14 shows the configuration of a charging device of Embodiment 4.

A charging device 124 of Embodiment 4 is described with the aid of figures. FIG. 14 shows the circuit configuration of the charging device 124 of Embodiment 4. A portion of the charging device 124 has an identical configuration and operation as the charging device 4 of Embodiment 1. Consequently, the same reference numbers are assigned thereto and an explanation thereof is omitted. In FIG. 14, the battery pack 40 is connected with the charging device 124. The charging device 124 charges the rechargeable battery 42 housed within the battery 40.

As shown in FIG. 14, the charging device 124 has a reference voltage circuit 126. The reference voltage circuit 126 connects resistors 131, 132, 133, and 134 in parallel, and a resistor 135 is connected therewith in series. The relationship between the resistance of the resistors 131 to 134 is as follows: 131<132<133<134. A constant-voltage regulated power supply Vcc is input to each of the resistors 131 to 134. Furthermore, switching elements 136, 137, 138, and 139 are interposed between the resistors 131, 132, 133, 134 and constant-voltage regulated power supply Vcc, respectively. The switching elements 136 to 139 are selectively switched by the microcomputer 14. If, for example, only the switching element 136 is 'on', the resistor 131 and the resistor 135 are connected in series, and the constant voltage Vcc is divided by the resistor 131 and the resistor 135. The divided voltage appears as a voltage VC at a node C in the figure. This voltage VC is input to the voltage comparing circuit 15. It is possible to selectively switch the voltage inputted to the voltage comparing circuit 15 by selectively switching the switching elements 136 to 139.

The voltage comparing circuit 15 compares the voltage across the resistor 36 and the output voltage of the reference voltage circuit 126. Based on the results of comparison, the voltage comparing circuit 15 commands the PWM controlling circuit 16 to increase or decrease the duty ratio. The charging current is adjusted according to the resistance of the resistors 131 to 134. The resistance of the resistors 131 to 134 are set to correspond to the target values CC1 to CC4 of the charging current: the resistance of the resistor 131 corresponds to a target charging current value CC1, 132 corresponds to CC2, 133 to CC3, and 134 to CC4. These target charging current values have the relationship: CC1>CC2>CC3>CC4.

The microcomputer 14 selectively switches the switching elements 136 to 139 based on the temperature of the rechargeable battery 42. By this means, the target charging current values CC1 to CC4 are set according to the temperature of the rechargeable battery 42.

In the charging device 124, the voltage across the resistor 36 is input to the microcomputer 14. That is, the microcomputer 14 learns the charging current. When the detected charging current is smaller than the target value that has been set, the microcomputer 14 determines that the limiter function of the PWM controlling circuit 16 is operating. In this case, the target value for the charging current is reduced by one step. That is, of the switching elements 136 to 139, a different switching element is turned 'on'. If for example only the switching element 136 was 'on' at this juncture, the switching element 136 is turned 'off' and the switching element 137 is turned 'on'.

Figure 15:
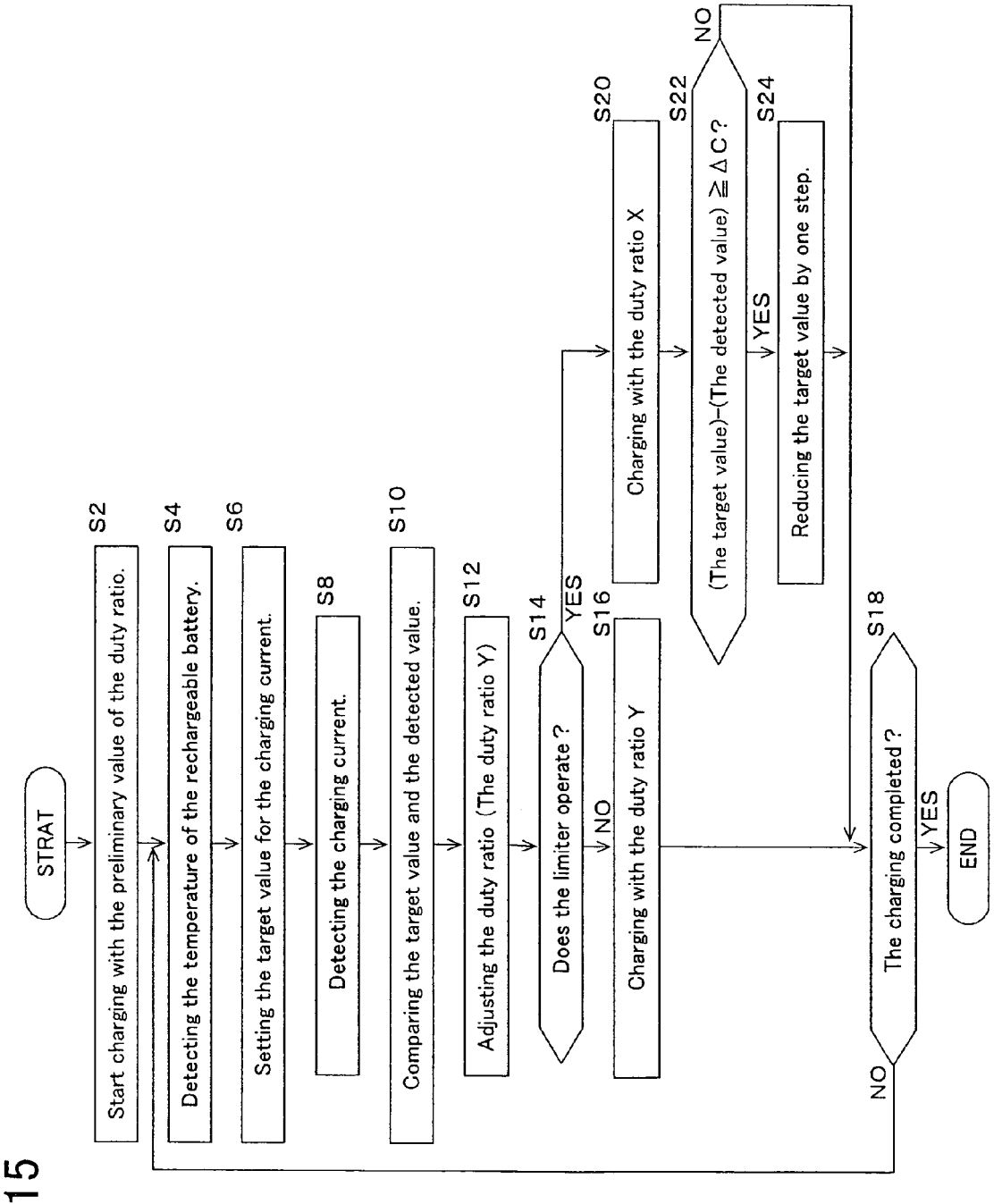
FIG. 15 is a flowchart showing the sequence of operation of the charging device of Embodiment 4.

FIG. 15 is a flowchart showing the sequence of operations of the charging device 124. Below, descriptions are given of points differing from the flowchart of FIG. 7. Steps S2 to S12 of FIG. 15 are identical with steps S2 to S12 of FIG. 7.

If the limiter function operates at step S14 of FIG. 15, then the duty ratio is restricted to 'X' and the charging current is reduced at step S20.

At step S22, the microcomputer 14 detects the reduction of the charging current. The microcomputer 14 compares the detected charging current with the target value that has been set, and determines whether the difference therebetween is equal to or above a value ΔC. If the difference is equal to or above ΔC (YES), the process proceeds to step S24. If not (NO), the process proceeds to step S18.

At step S24, as described earlier, the microcomputer 14 reduces the target value for the charging current by one step. For example, if the target value for the charging current value is CC1, the target value is reduced to CC2. Specifically, if for example the switching element 136 of the reference voltage circuit 126 is 'on', the microcomputer 14 turns 'off', the switching element 136, and turns 'on' the switching element 137. The process then proceeds to step S18. The remainder is the same as with the charging device 4 shown in FIG. 7.

Figure 16:
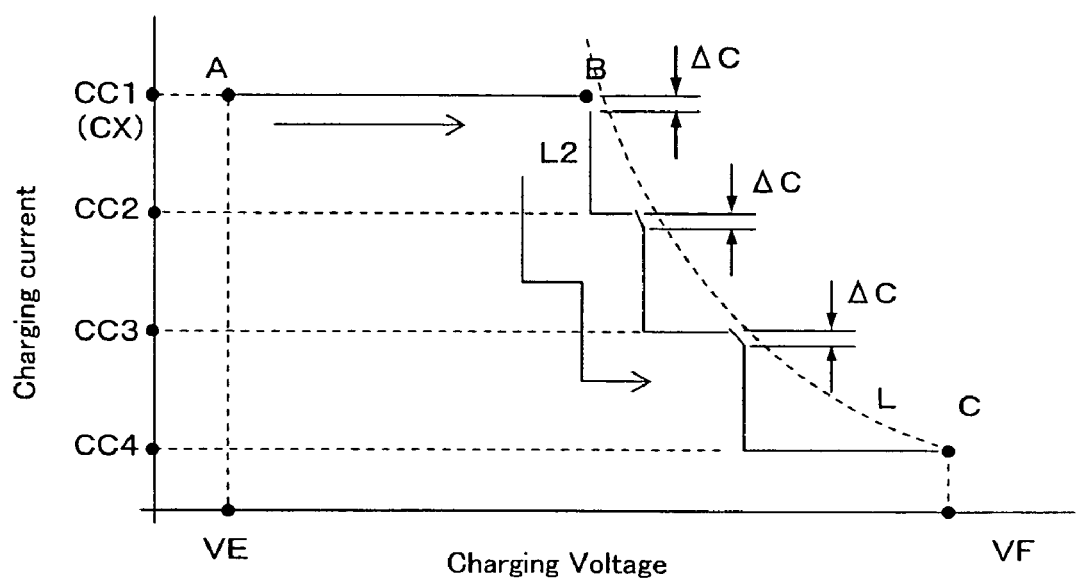
FIG. 16 is a figure showing the relationship between the charging current and the charging voltage during charging operation by the charging device of Embodiment 4.

FIG. 16 shows an example of the relationship between the charging current and the charging voltage when the battery pack 40 is being charged by using the sequence described above. 'L2' in the figure shows a case where the power supply voltage is 180V. A relationship 'L', for the charging device 4 shown in FIG. 8 (in which the power supply voltage is 180V), is also shown by the broken line 'L'. As shown in FIG. 16, in the charging device 124—as with the charging device 4—charging power is restricted to the restricted value CP1, and the amount of temperature increase ΔT of the MOSFET 18 does not exceed the boundary value ΔT1.

As shown in FIG. 16, the charging current is adjusted to be equal to one of target values CC1 to CC4 in the charging device 124. In FIG. 16, the charging current is kept at CC1 between the point A and the point B at the beginning of charging operation. Consequently it is clear that the charging current has been set at the target value CC1. The charging power increases as charging proceeds, and the limiter function of the PWM controlling circuit 16 operates when the combination of the charging voltage and the charging current reaches the point B. The limiter function restricts the charging power, thus reducing the charging current. When the charging current is reduced to the value of CC1-ΔC (step S22 of FIG. 15: YES), the microcomputer 14 reduces the target charging current by one step (step S24 of FIG. 15). That is, the target value of the charging current is changed from CC1 to CC2. Since the target value of the charging current is changed to a lower value, the flow of charging power is reduced. That is, the current flowing through the MOSFET 18 is reduced, and the limiter function of the PWM controlling circuit 16 no longer operates. Consequently, the charging current can be adjusted to the target value CC2 set by the microcomputer 14.

As charging proceeds further, the charging power increases as the charging voltage rises. The limiter function of the PWM controlling circuit 16 operates again and reduces the charging current so that it corresponds to the target value. When the charging current has been reduced to the value of CC2-ΔC, the target value of the charging current is changed from the value CC2 to the value CC3. Thereafter, the charging current is maintained at the target value CC3 set by the microcomputer 14.

In the charging device 124, the actual charging current and the target charging current commanded by the microcomputer 14 are almost always identical. By this means, the microcomputer 14 can estimate an integrated value of the charging current from the product of the target charging current value that has been set and the command time thereof It is not necessary to detect and then integrate the actual current value, and this computation can be performed easily. The integrated value of the charging current can be used, for example, in detecting a fully charged state, etc.

In the above description, the case was described where the power supply voltage is 180V. However, the cases where the power supply voltages are 220V or 260V are similar. In any power supply voltage, the maximum charging power is restricted so that the temperature increase of the MOSFET 18 remains within the permissible level ΔT1. The maximum charging power is changed depending on the power supply voltage. The target charging current is changed step-by step within the maximum charging power.

In the charging device 124, the target charging current has four values. However, it can be adjusted to further steps. To do so, further groups of resistances may be used in the configuration of the resistors 131 to 134 of the reference voltage circuit 126.

Specific examples of embodiments of the present invention are presented above, but these merely illustrate some possibilities of the invention and do not restrict the claims thereof The art set forth in the claims includes transformations and modifications to the specific examples set forth above.

The technical elements disclosed in the present specification or figures may be utilized separately or in all types of conjunctions and are not limited to the conjunctions set forth in the claims at the time of submission of the application. Furthermore, the art disclosed in the present specification or figures may be utilized to simultaneously realize a plurality of aims or to realize one of these aims.

The invention claimed is:

1. A charging device for connection to an external power supply and to charge a rechargeable battery, comprising:
    a switching element for increasing or decreasing charging power supplied to the rechargeable battery;
    a PWM controlling circuit that has an output terminal connected to the switching element and outputs pulse signals from the output terminal for intermittently turning the switching element on and off;
    a current detecting circuit for detecting current flowing through the switching element and outputting voltage corresponding to the current flowing through the switching element;
    a correcting circuit for correcting output voltage of the current detecting circuit by a correction amount that changes depending on power supply voltage from the external power supply,
    a setting means for setting a target value of charging current flowing through the rechargeable battery; and
    a charging current detecting circuit for detecting the charging current flowing through the rechargeable battery, and
    wherein the PWM controlling circuit also has a limiter terminal into which corrected voltage from the correcting circuit is input and the PWM controlling circuit stops outputting the pulse signals when the corrected voltage input to the limiter terminal is equal to or above a predetermined limiter value, wherein the PWM controlling circuit adjusts a duty ratio of the switching element so that the charging current will be adjusted to the set target value; and the setting means reduces the target value of the charging current when the detected charging current becomes smaller, by a predetermined amount, than the set target value.

2. A charging device as set forth in claim 1, wherein
    the correcting circuit applies a bias voltage to the output voltage of the current detecting circuit, wherein the bias voltage is higher as the power supply voltage is higher.

3. A charging device as set forth in claim 1, wherein
the correcting circuit corrects the output voltage of the current detecting circuit to the predetermined limiter value irrespective of differences in the power supply voltages when the current flowing through the switching element reaches a permitted value that causes a predetermined temperature increase to the switching element, the permitted value varying depending on the power supply voltage.

4. A charging device as set forth in claim 3, wherein
the correcting circuit applies a bias voltage to the output voltage of the current detecting circuit, wherein the bias voltage is higher as the power supply voltage is higher.

5. A charging device as set forth in claim 3, wherein
the correcting circuit divides the output voltage of the current detecting circuit by a ratio that increases as the power supply voltage increases.

* * * * *